(12) United States Patent
Takeuchi et al.

(10) Patent No.: US 7,823,401 B2
(45) Date of Patent: Nov. 2, 2010

(54) REFRIGERANT CYCLE DEVICE

(75) Inventors: Hirotsugu Takeuchi, Nagoya (JP);
Makoto Ikegami, Kariya (JP);
Haruyuki Nishijima, Obu (JP)

(73) Assignee: Denso Corporation, Kariya (JP)

( * ) Notice: Subject to any disclaimer, the term of this patent is extended or adjusted under 35 U.S.C. 154(b) by 342 days.

(21) Appl. No.: 11/977,479

(22) Filed: Oct. 25, 2007

(65) Prior Publication Data
US 2008/0098757 A1 May 1, 2008

(30) Foreign Application Priority Data
Oct. 27, 2006 (JP) .............................. 2006-292347

(51) Int. Cl.
*F25B 49/00* (2006.01)
(52) U.S. Cl. .............................. 62/197; 62/216; 62/408
(58) Field of Classification Search .................. 62/500, 62/216, 917
See application file for complete search history.

(56) References Cited

U.S. PATENT DOCUMENTS

| | | | | |
|---|---|---|---|---|
| 4,269,211 A * | 5/1981 | Howard et al. | ................. | 137/2 |
| 4,574,827 A * | 3/1986 | Konak | ........................... | 137/89 |
| 4,824,614 A * | 4/1989 | Jones | ......................... | 261/76 |
| 5,130,082 A * | 7/1992 | Oosterkamp | ................. | 376/371 |
| 5,156,014 A * | 10/1992 | Nakamura et al. | ............ | 62/160 |
| 5,259,198 A * | 11/1993 | Viegas et al. | ..................... | 62/7 |
| 5,343,711 A * | 9/1994 | Kornhauser et al. | ........... | 62/116 |
| 5,810,032 A * | 9/1998 | Hong et al. | ............. | 137/561 A |
| 6,438,993 B2 * | 8/2002 | Takeuchi et al. | ............... | 62/500 |
| 6,918,266 B2 * | 7/2005 | Ikegami et al. | ................. | 62/500 |
| 7,059,150 B2 * | 6/2006 | Komatsu et al. | ............... | 62/500 |
| 7,178,359 B2 * | 2/2007 | Oshitani et al. | ............... | 62/500 |
| 7,367,200 B2 * | 5/2008 | Ikegami et al. | ................. | 62/278 |
| 7,416,903 B2 * | 8/2008 | Sklar et al. | ................... | 436/180 |

(Continued)

FOREIGN PATENT DOCUMENTS

EP  1 719 650  11/2006

(Continued)

OTHER PUBLICATIONS

Office Action dated Jun. 05, 2009 in corresponding Chinese Application No. 2007 10184820.0.

(Continued)

*Primary Examiner*—George Nguyen
(74) *Attorney, Agent, or Firm*—Harness, Dickey & Pierce, PLC

(57) ABSTRACT

In a refrigerant cycle device having an ejector, a branch portion for branching a flow of refrigerant flowing out of the ejector into at least a first refrigerant stream and a second refrigerant stream is located. A first evaporator for evaporating the refrigerant of the first refrigerant stream is located to allow the refrigerant to flow to a suction side of the compressor, and a second evaporator for evaporating the refrigerant of the second refrigerant stream is located to allow the refrigerant to flow to an upstream side of a refrigerant suction port of the ejector. In addition, the branch portion is located to maintain a dynamic pressure of the refrigerant flowing out of the ejector, and the second evaporator is connected to the branch portion in a range where the dynamic pressure can be applied to an inside of the second evaporator.

15 Claims, 13 Drawing Sheets

U.S. PATENT DOCUMENTS

| | | | |
|---|---|---|---|
| 2003/0140651 A1* | 7/2003 | Takeuchi et al. | 62/500 |
| 2005/0178150 A1* | 8/2005 | Oshitani et al. | 62/500 |
| 2005/0274141 A1* | 12/2005 | Takeuchi et al. | 62/500 |
| 2006/0156745 A1* | 7/2006 | Ikegami et al. | 62/170 |

FOREIGN PATENT DOCUMENTS

| | | |
|---|---|---|
| JP | 57-73564 | 5/1982 |
| JP | 57-73566 | 5/1982 |
| JP | 03-291465 | 12/1991 |
| JP | 2000-283577 | 10/2000 |
| JP | 2004-003804 | 1/2004 |
| JP | 2006-292351 | 10/2006 |

OTHER PUBLICATIONS

Office Action dated Aug. 26, 2008 in Korean Application No. 10-2007-0108561 with English translation.

* cited by examiner

REFRIGERANT CYCLE DEVICE

CROSS REFERENCE TO RELATED APPLICATION

This application is based on Japanese Patent Application No. 2006-292347 filed on Oct. 27, 2006, the contents of which are incorporated herein by reference in its entirety.

FIELD OF THE INVENTION

The present invention relates to a refrigerant cycle device including an ejector, and an operating method of the refrigerant cycle device.

BACKGROUND OF THE INVENTION

Conventionally, JP-A-3-291465 discloses a refrigerant cycle device including an ejector. In the refrigerant cycle device as disclosed in JP-A-3-291465, a vapor/liquid separator for separating refrigerant into liquid and vapor phases is disposed on the downstream side of the ejector. The vapor/liquid separator separates the flow of refrigerant into one flow which is to be sucked into a compressor, and the other flow which is to be sucked into a refrigerant suction port of the ejector.

A first evaporator is disposed between the vapor/liquid separator and the compressor, and a throttle device and a second evaporator are disposed between the vapor/liquid separator and the refrigerant suction port of the ejector. Both evaporators exhibit a heat absorption effect of the refrigerant. At this time, the effect of decompression by the throttle device lowers a refrigerant evaporation pressure of the second evaporator (refrigerant evaporation temperature) as compared to that of the first evaporator, so that the refrigerant can evaporate in different temperature ranges at both the evaporators.

When the refrigerant cycle device as disclosed in JP-A-3-291465 is actually actuated, the second evaporator may be operated without exhibiting a refrigeration capacity. The inventors have studied about the cause for this problem, and found that the problem is due to arranging a throttle device on the upstream side of the second evaporator. The reason for this is that the decompression and expansion of the refrigerant by the throttle device results in a loss of kinetic energy of the refrigerant, so that a dynamic pressure of the refrigerant after the decompression and expansion is decreased as compared to that of the refrigerant before the decompression and expansion.

That is, when the dynamic pressure of the refrigerant after the decompression and expansion is decreased, the dynamic pressure at the outlet of the ejector cannot be applied to refrigerant on the downstream side of the throttle device. As a result, a pressure difference between a static pressure of the refrigerant on an outlet side of the throttle device and a static pressure of the refrigerant on the refrigerant suction port of the ejector has to cause the refrigerant on the downstream side of the throttle device to flow into the second evaporator.

When the vapor/liquid separator is disposed on the upstream side of the throttle device, like the cycle as disclosed in JP-A-3-291465, the separation of the refrigerant into the liquid and vapor phases at the vapor/liquid separator also results in the loss of the kinetic energy of the refrigerant with little dynamic pressure of the refrigerant after the decompression and expansion. Thus, only the pressure difference between the static pressure of the refrigerant on the outlet side of the throttle device and the static pressure of the refrigerant on the refrigerant suction port of the ejector needs to allow the refrigerant on the downstream side of the throttle device to flow into the second evaporator.

Thus, even in operating the cycle as disclosed in JP-A-3-291465, when a loss of pressure between an inlet and an outlet of the second evaporator is larger than the pressure difference between the static pressure of the refrigerant on the outlet side of the throttle device and that of the refrigerant at the refrigerant suction port of the ejector, the refrigerant is not allowed to flow into the second evaporator. As a result, the second evaporator may not obtain the refrigeration capacity.

SUMMARY OF THE INVENTION

In view of the foregoing problems, it is an object of the present invention to provide a refrigerant cycle device having an ejector, which can suitably obtain refrigerant capacity in an evaporator in which refrigerant branched at a downstream side of the ejector flows to be drawn into a refrigerant suction port of the ejector.

It is another object of the present invention to provide an operation method of a refrigerant cycle device.

According to an aspect of the present invention, a refrigerant cycle device includes: a compressor for compressing and discharging refrigerant; a radiator for cooling high-temperature and high-pressure refrigerant discharged from the compressor; an ejector including a nozzle portion for decompressing and expanding the refrigerant on a downstream side of the radiator, and a refrigerant suction port from which refrigerant is drawn by a refrigerant flow jetted from the nozzle portion at high velocity; a branch portion for branching a flow of the refrigerant flowing out of the ejector into at least a first refrigerant stream and a second refrigerant stream; a first evaporator for evaporating the refrigerant of the first refrigerant stream branched by the branch portion to allow the refrigerant to flow to a suction side of the compressor; and a second evaporator for evaporating the refrigerant of the second refrigerant stream branched by the branch portion to allow the refrigerant to flow to an upstream side of the refrigerant suction port.

In the refrigerant cycle device, the branch portion can be located to maintain a dynamic pressure of the refrigerant flowing out of the ejector, and the second evaporator is connected to the branch portion in a range where the dynamic pressure of the refrigerant flowing out of the ejector is applied to an inside of the second evaporator. This surely allows the refrigerant to flow into the second evaporator, as compared to a case in which only the pressure difference between the static pressures causes the refrigerant to flow into the second evaporator. As a result, the second evaporator connected to the refrigerant suction port of the ejector can obtain an appropriate refrigeration capacity.

The suction side of the compressor is connected to the downstream side of the first evaporator, so that the operation of the compressor surely enables the refrigerant to flow into the first evaporator. Thus, the first evaporator can also obtain an appropriate refrigeration capacity. As a result, the refrigeration capacity of the entire cycle can be improved in the refrigerant cycle device.

The phrase "dynamic pressure is maintained" as used herein means that the existence of the dynamic pressure is maintained, including a state in which the dynamic pressure is never decreased. That is, the phrase also includes a state in which the dynamic pressure is slightly decreased due to a pressure loss when the refrigerant passes through the branch portion or a pipe constituting the branch portion.

According to another aspect of the present invention, the branch portion and the second evaporator are connected without a throttling therebetween such that the dynamic pressure of the refrigerant flowing out of the ejector is applied to the inside of the second evaporator Therefore, the dynamic pressure at the outlet of the ejector can be easily applied to the inside of the second evaporator.

According to another aspect of the present invention, the ejector may further include a diffuser portion in which the refrigerant jetted from the nozzle portion and the refrigerant drawn from the refrigerant suction port are mixed and the mixed refrigerant is pressurized. In this case, the branch portion is connected to the ejector and the second evaporator such that the following relationship is satisfied in a target flow amount of refrigerant drawn into the refrigerant suction port:

$$(Ps1-Ps4)+Pv1 \geq (Ps1-Ps2)+(Ps2-Ps3)+(Ps3-Ps4)+Pv2$$

wherein Ps1 is a static pressure of the refrigerant at an outlet of the diffuser portion, Pv1 is a dynamic pressure of the refrigerant at the outlet of the diffuser portion, Ps2 is a static pressure of the refrigerant at an inlet of the second evaporator, Pv2 is a dynamic pressure of the refrigerant at the inlet of the second evaporator, Ps3 is a static pressure of the refrigerant at an outlet of the second evaporator, and Ps4 is a static pressure of the refrigerant at the refrigerant suction port. In this case, the target flow amount can be drawn into the refrigerant suction port of the ejector after passing through the second evaporator.

As an example, a throttle device may be provided for decompressing and expanding the refrigerant in a refrigerant flow path from the branch portion to the inlet of the second evaporator. Accordingly, the above relationship can be easily set using the throttle device.

The second evaporator may include a plurality of evaporating portions connected in series in a refrigerant flow. In this case, a throttle device, for decompressing and expanding the refrigerant, may be located between the evaporating portions.

In any refrigerant cycle device described above, there may be provided with a refrigerant distribution unit that includes an introduction pipe for allowing the refrigerant to flow thereinto, a first leading pipe for allowing the refrigerant to flow to the first evaporator, and a second leading pipe for allowing the refrigerant to flow to the second evaporator. In this case, the branch portion may be located inside of the refrigerant distribution unit, and an inflow direction of the refrigerant in the introduction pipe may be substantially the same as an outflow direction of the refrigerant in the second leading pipe. Alternatively, an outflow direction of the refrigerant in the first leading pipe and an outflow direction of the refrigerant in the second leading pipe may be respectively directed in predetermined directions with respect to an inflow direction of the refrigerant in the introduction pipe, while intersecting at a sharp angle.

According to another aspect of the present invention, an operation method of a refrigerant cycle device includes a step of compressing and discharging refrigerant from a compressor; a step of cooling high-temperature and high-pressure refrigerant discharged from the compressor by using a radiator; a step of decompressing and expanding the refrigerant on a downstream side of the radiator in a nozzle portion of an ejector, while sucking refrigerant through a refrigerant suction port of the ejector by a refrigerant flow jetted from the nozzle portion at high velocity; a step of branching a flow of the refrigerant flowing out of the ejector into at least a first refrigerant stream and a second refrigerant stream; a step of evaporating the refrigerant of the first refrigerant stream branched by the branch portion in a first evaporator to allow the refrigerant to flow to a suction side of the compressor; and a step of evaporating the refrigerant of the second refrigerant stream branched by the branch portion in a second evaporator to allow the refrigerant to flow to an upstream side of the refrigerant suction port. Furthermore, the step of the branching is performed to maintain a dynamic pressure of the refrigerant flowing out of the ejector and to apply the dynamic pressure of the refrigerant flowing out of the ejector to an inside of the second evaporator. As a result, the second evaporator connected to the refrigerant suction port of the ejector can obtain an appropriate refrigeration capacity.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
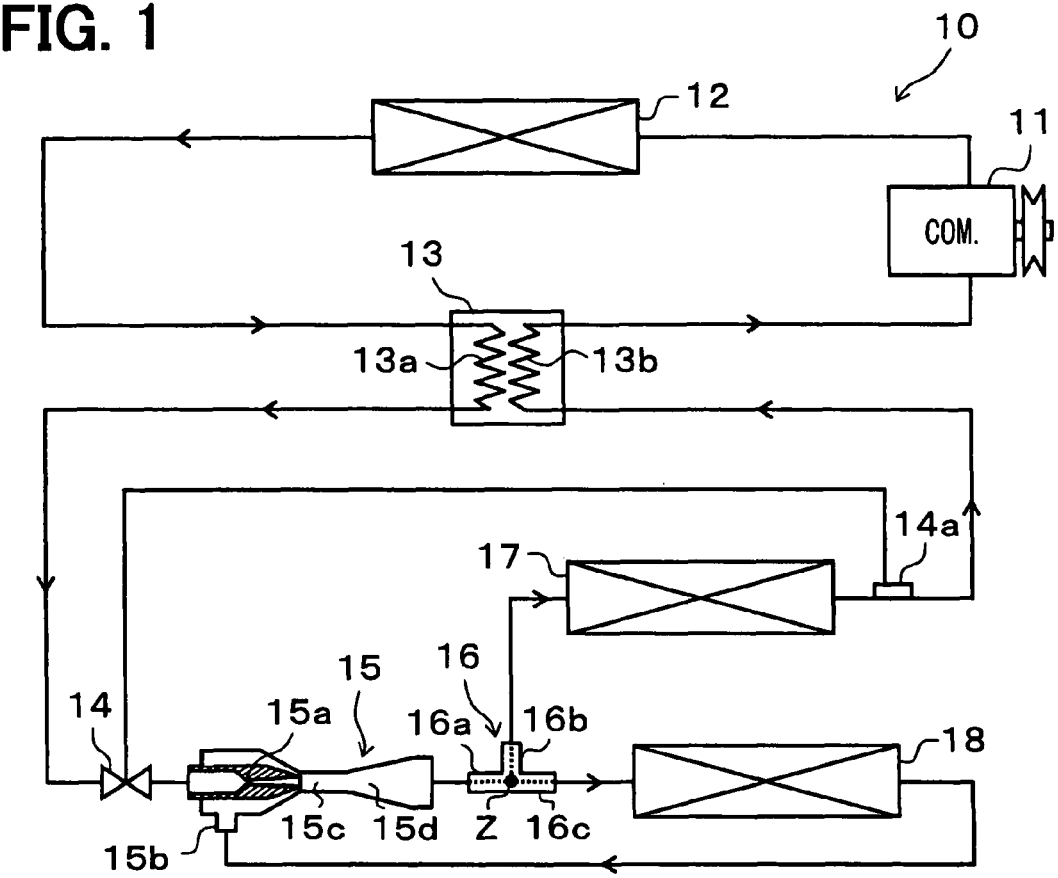
FIG. 1 is a schematic diagram showing a refrigerant cycle device having an ejector, according to a first embodiment of the present invention.

A first embodiment of the invention will be described below with reference to FIGS. 1 to 3. A refrigerant cycle device 10 includes a refrigerant cycle in which refrigerant is circulated. In the refrigerant cycle, a compressor 11 is located to suck, compress, and then discharge the refrigerant. The compressor 11 is rotatably driven by a driving force transmitted from an engine for vehicle running (not shown) via a pulley and a belt, for example.

As the compressor 11, may be used either of a variable displacement compressor for being capable of adjusting a refrigerant discharge capacity depending on a change in discharge capacity, or a fixed displacement compressor for adjusting a refrigerant discharge capacity by changing an operating efficiency of the compressor by intermittent connection of an electromagnetic clutch. The use of an electric compressor as the compressor 11 can adjust the refrigerant discharge capacity by adjustment of the number of revolutions of an electric motor.

A radiator 12 is connected to the refrigerant discharge side of the compressor 11. The radiator 12 is a heat exchanger for heat radiation that exchanges heat between high-pressure refrigerant discharged from the compressor 11 and outside air (i.e., air outside a vehicle compartment) blown by a cooling fan (not shown) to radiate heat from the high-pressure refrigerant.

The refrigerant cycle device 10 of the first embodiment constitutes a subcritical cycle in which high-pressure side refrigerant pressure does not exceed the critical pressure of the refrigerant, using a Freon-based refrigerant as the refrigerant. In this case, the radiator 12 serves as a condenser for condensing the refrigerant. A liquid receiver (not shown) may be provided on the outlet side of the radiator 12 to separate the refrigerant into liquid and vapor phases and then to store excess liquid-phase refrigerant in the refrigerant cycle. The liquid-phase refrigerant is guided to flow out of the liquid receiver into the downstream side of the refrigerant cycle.

The radiator 12 for use may be a so-called sub-cool type condenser which includes a heat exchanging portion for condensation disposed on the upstream side of the refrigerant flow, the liquid receiver for receiving the refrigerant introduced from the heat exchanging portion for condensation to separate the refrigerant into the liquid and vapor phases, and another heat exchanging portion for supercooling the saturated liquid-phase refrigerant from the liquid receiver.

A high-pressure side refrigerant flow path 13*a* of an internal heat exchanger 13 is connected to the downstream side of the radiator 12. The internal heat exchanger 13 exchanges heat between the refrigerant on the outlet side of the radiator 12 passing through the high-pressure side refrigerant flow path 13*a* and the refrigerant on the suction side of the compressor 11 passing through a low-pressure side refrigerant flow path 13*b* to cool the refrigerant passing through the high-pressure side refrigerant flow path 13*a*. This can increase a difference in enthalpy (refrigeration capacity) of the refrigerant between the refrigerant inlet and outlet of each of the first and second evaporators 17 and 18 to be described later.

Various specific structures can be applied to the internal heat exchanger 13. Specifically, the internal heat exchanger 13 may be a structure in which refrigerant pipes for forming the high-pressure side refrigerant flow path 13*a* and the low-pressure side refrigerant flow path 13*b* are brazed and connected to each other to perform heat exchange therebetween, or a structure of a double pipe type heat exchanger in which the low-pressure side refrigerant flow path 13*b* is arranged inside of an outside pipe forming the high-pressure side refrigerant flow path 13*a*.

An expansion valve 14 is connected to the outlet side of the high-pressure side refrigerant flow path 13*a* of the internal heat exchanger 13. The expansion valve 14 is a decompression means for decompressing the high-pressure liquid-phase refrigerant to an intermediate pressure, and also a flow amount adjustment means for adjusting the flow amount of refrigerant flowing out to the downstream thereof, that is, to a nozzle portion 15*a* of the ejector 15 to be described later. Thus, the expansion valve 14 serves as the flow amount adjustment means for adjusting the flow amount of the refrigerant flowing into the nozzle portion 15*a*.

For example, a known thermal expansion valve may be adopted as the expansion valve 14. The thermal expansion valve has a temperature sensing portion 14*a* disposed on the downstream side of the first evaporator 17. The expansion valve 14 senses the degree of superheat of the refrigerant on the downstream side of the first evaporator 17 based on the temperature and pressure of the refrigerant on the downstream side of the first evaporator 17, and adjusts the degree of opening of the valve (refrigerant flow amount) such that the superheat degree of the refrigerant on the downstream side of the first evaporator 17 becomes a predetermined value previously set.

The ejector 15 is connected to the downstream side of the expansion valve 14. The ejector 15 is used as a decompression means for decompressing the refrigerant, and is also used as a refrigerant circulation means for circulating the refrigerant by a suction effect of a refrigerant flow injected at high velocity.

Specifically, the ejector 15 includes the nozzle portion 15*a* that has a reduced sectional area of a refrigerant passage to further decompress the intermediate-pressure refrigerant having flown from the expansion valve 14, and a refrigerant suction port 15*b* provided in communication with a refrigerant injection port of the nozzle portion 15*a* to suck the refrigerant flowing from the second evaporator 18 to be described later.

A mixing portion 15*c* is provided on the downstream side of the refrigerant flow from the nozzle portion 15*a* and the refrigerant suction port 15*b*, so as to mix the high-velocity refrigerant flow injected from the nozzle portion 15*a* with the suction refrigerant drawn from the refrigerant suction port 15*b*. A diffuser portion 15*d* serving as a pressure increasing portion is provided on the downstream side of the refrigerant flow of the mixing portion 15*c*.

The diffuser portion 15*d* is formed in such a shape to gradually increase the passage area of the refrigerant, and has an effect of reducing the velocity of the refrigerant flow to increase the refrigerant pressure, that is, an effect of converting the velocity energy of the refrigerant to the pressure energy thereof.

A refrigerant distribution unit 16 for branching the refrigerant flow of the ejector 15 is connected to the downstream side of an outlet of the diffuser portion 15*d* of the ejector 15. The refrigerant distribution unit 16 will be described in detail below with reference to FIG. 2. FIG. 2 is a sectional view in the axial direction of an introduction pipe 16a of the refrigerant distribution unit 16.

Figure 2:
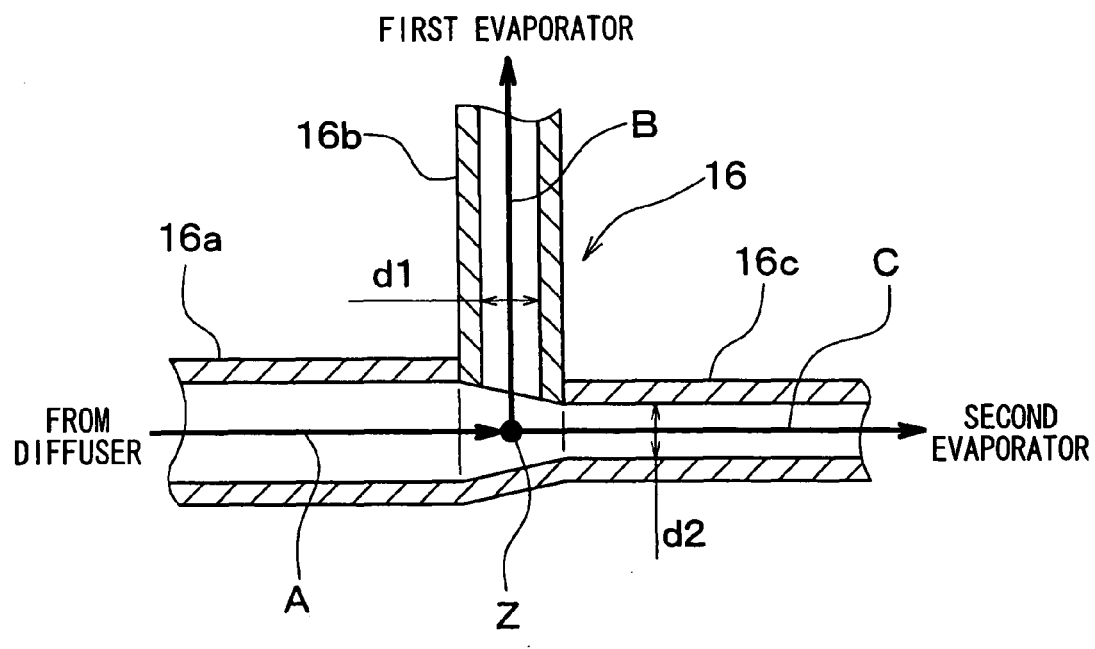
FIG. 2 is a schematic sectional view showing a refrigerant distribution unit for the refrigerant cycle device according to the first embodiment.

The refrigerant distribution unit 16 is a T-shaped three-way joint structure including substantially linear pipes with different diameters connected to one another, as shown in FIG. 2. The refrigerant distribution unit 16 includes the introduction pipe 16a for allowing the refrigerant from the ejector 15 to flow thereinto, a first leading pipe 16b for allowing the refrigerant to flow to the first evaporator 17, and a second leading pipe 16c for allowing the refrigerant to flow to the second evaporator 18.

As shown in FIG. 2, the introduction pipe 16a and the second leading pipe 16c are connected to each other such that the inflow direction of the refrigerant in the introduction pipe 16a (i.e., the direction of arrow A) is substantially on the same axis as the outflow direction of the refrigerant in the second leading pipe 16c (i.e., the direction of arrow C). The first leading pipe 16b is connected to a connection portion between the introduction pipe 16a and the second leading pipe 16c.

The outflow direction of the refrigerant (i.e., the direction of arrow B) in the first leading pipe 16b is directed substantially perpendicular to the directions of arrows A and C. Thus, the refrigerant flowing into the introduction pipe 16a is branched by a branch portion Z that is formed within the refrigerant distribution unit 16 at the connection portion between the first leading pipe 16b and the second leading pipe 16c.

Since the flow direction of the refrigerant flowing into the introduction pipe 16a (the direction of arrow A) is substantially the same as the flow direction of the refrigerant flowing from the second leading pipe 16c (the direction of arrow C), the refrigerant having passed through the introduction pipe 16a flows into the second leading pipe 16c without unnecessarily decreasing the flow velocity. Accordingly, the dynamic pressure of the refrigerant flowing from the diffuser portion 15d of the ejector 15 can be maintained when the refrigerant flow is branched at the branch portion Z of the refrigerant distribution unit 16.

By setting a pipe diameter φd1 of the first leading pipe 16b and a pipe diameter φd2 of the second leading pipe 16c to appropriate values, it is possible to perform appropriate adjustment of a flow amount ratio of a flow amount of the refrigerant flowing into the first evaporator 17 to a flow amount of the refrigerant flowing into the second evaporator 18. Thus, the refrigerant can be supplied in appropriate flow amounts to the first evaporator 17 and the second evaporator 18.

The refrigerant distribution unit 16 can be formed easily by connecting metallic pipes with different diameters by use of connection means, such as brazing or welding. Alternatively, resin pipes may be connected to form the distribution unit. Furthermore, a plurality of refrigerant passages may be formed using a metallic block or resin block having a rectangular parallelepiped shape.

FIG. 1 schematically shows the cycle structure of the first embodiment with the refrigerant distribution unit 16 and the second evaporator 18 connected to each other via a pipe. However, the diffuser portion 15d of the ejector 15, the refrigerant distribution unit 16, the first evaporator 17, and the second evaporator 18 can be connected directly to each other, or can be close to each other via short pipes. Such connection further maintains the dynamic pressure of the refrigerant flowing from the ejector 15 when the refrigerant flow is branched.

The first evaporator 17 connected to the first leading pipe 16b is a heat exchanger for heat absorption which exchanges heat between one of refrigerant streams branched by the refrigerant distribution unit 16 and air blown by a blower fan (not shown). Therefore, in the first evaporator 17, low-pressure refrigerant is evaporated, thereby exhibiting the heat absorption effect. The outlet side of the first evaporator 17 is connected to the inlet side of the low-pressure side refrigerant flow path 13b of the internal heat exchanger 13 as mentioned above, and the outlet side of the low-pressure side refrigerant flow path 13b is connected to the refrigerant suction side of the compressor 11.

That is, the first evaporator 17 corresponds to an evaporator connected in series to a decompression unit in a normal vapor-compression refrigerant cycle device, which is constructed of a compressor, a radiator, the decompression unit, and an evaporator connected in an annular shape. In the first embodiment, the first evaporator 17 is connected in series to the ejector 15 serving as the decompression unit.

The second evaporator 18 connected to the second leading pipe 16c is a heat exchanger for heat absorption which exchanges heat between the other of refrigerant streams branched by the refrigerant distribution unit 16 and air blown by a blower fan (not shown). Therefore, in the second evaporator 18, low-pressure refrigerant is evaporated, thereby exhibiting the heat absorption effect. The outlet side of the second evaporator 18 is connected to the refrigerant suction port 15b of the ejector 15 as described above.

Now, the operation of the refrigerant cycle device 10 with the above-mentioned structure in the first embodiment will be described with reference to FIG. 3. FIG. 3 is a Mollier diagram schematically showing states of the refrigerant in the refrigerant cycle device 10 of the first embodiment.

In the first embodiment, when the compressor 11 is driven by the vehicle engine, the compressor 11 sucks, compresses, and then discharges high-temperature and high-pressure vapor-phase refrigerant. The state of the refrigerant discharged from the compressor 11 corresponds to a point "a" in FIG. 3. The high-temperature and high-pressure vapor-phase refrigerant discharged from the compressor 11 flows into the radiator 12, and exchanges heat with the blown air (outside air) blown from the cooling fan to radiate heat therefrom (which corresponds to a change from the point "a" to a point "b" in FIG. 3).

Figure 3:
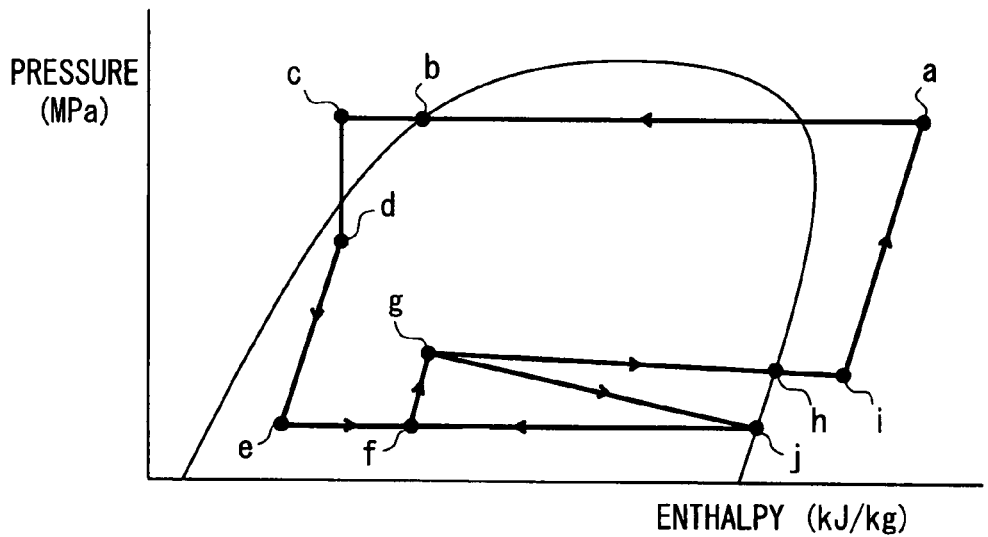
FIG. 3 is a Mollier diagram showing a refrigerant state in a refrigerant cycle according to the first embodiment.

The refrigerant flowing from the radiator 12 flows into the high-pressure side refrigerant flow path 13a of the internal heat exchanger 13 to exchange heat with the refrigerant passing through the low-pressure side refrigerant flow path 13b to be sucked into the compressor 11, and then cooled to be in a supercooled state (which corresponds to a change from the point "b" to a point "c" in FIG. 3).

The refrigerant flowing out of the high-pressure side refrigerant flow path 13a flows into the expansion valve 14 to be decompressed to an intermediate pressure so as to be brought into a vapor-liquid two-phase state (which corresponds to a change from the point "c" to a point "d" in FIG. 3). The vapor-liquid two-phase refrigerant flows into the nozzle portion 15a of the ejector 15. The refrigerant flowing into the nozzle portion 15a of the ejector 15 is decompressed and expanded isentropically (which corresponds to a change from the point "d" to a point "e" in FIG. 3).

At the time of decompression and expansion in the nozzle portion 15a of the ejector 15, the pressure energy of the refrigerant is converted to the velocity energy thereof, so that the refrigerant is injected from the refrigerant injection port of the nozzle portion 15a at high velocity. By the jet flow of the refrigerant injected from the nozzle portion 15a, the refrigerant having passed through the second evaporator 18 is drawn from the refrigerant suction port 15b.

The refrigerant injected from the nozzle portion 15a is mixed with the refrigerant sucked from the refrigerant suction port 15b in the mixing portion 15c of the ejector 15 (which corresponds to a changer from the point "e" to a point "f" in FIG. 3) to then flow into the diffuser portion 15d. The diffuser portion 15d converts the velocity energy of the refrigerant into the pressure energy thereof by enlarging the passage area, thereby increasing pressure of the refrigerant (which corresponds to a change from the point "f" to a point "g" in FIG. 3).

The refrigerant flowing out of the diffuser portion 15d is branched by the branch portion Z inside of the refrigerant distribution unit 16. One of the refrigerant streams branched at the branch portion Z of the refrigerant distribution unit 16 flows into the first evaporator 17 via the first leading pipe 16b, and absorbs heat from the blown air from the blower fan to evaporate. At this time, the refrigerant pressure is gradually decreased due to a loss of pressure in the first evaporator 17 (which corresponds to a change from the point "g" to a point "h" in FIG. 3).

The refrigerant flowing from the first evaporator 17 flows into the low-pressure side refrigerant flow path 13b of the internal heat exchanger 13 to exchange heat with the high-pressure refrigerant passing through the high-pressure side refrigerant flow path 13a, and then to be heated (which corresponds to a change from the point "h" to a point "i" in FIG. 3). The refrigerant heated in the low-pressure side refrigerant flow path 13b of the internal heat exchanger 13 is sucked into the compressor 11, and then compressed again (which corresponds to a change from the point "i" to the point "a" in FIG. 3).

The other refrigerant stream branched by the branch portion Z flows into the second evaporator 18 via the second leading pipe 16c, and absorbs heat from the blown air from the blower fan to evaporate. At this time, the refrigerant pressure is gradually decreased due to the loss of pressure in the second evaporator 18, and the suction effect of the ejector 15 (which corresponds to a change from the point "g" to a point "j" in FIG. 3). The refrigerant flowing from the second evaporator 18 is sucked into the refrigerant suction port 15b of the ejector 15 (which corresponds to a change from the point "j" to the point "f" in FIG. 3).

As mentioned above, in this embodiment, the refrigerant stream is branched by the refrigerant distribution unit 16 disposed on the outlet side of the diffuser portion 15d, so as to flow into the first evaporator 17 and the second evaporator 18. Thus, the first evaporator 17 and the second evaporator 18 can simultaneously perform the cooling operation for cooling air passing therethrough.

In the first embodiment, the refrigerant cycle device 10 involves branching of the refrigerant at the branch portion Z of the refrigerant distribution unit 16 while a dynamic pressure of the refrigerant flowing from the ejector 15 can be maintained. Therefore, it is possible to apply the dynamic pressure to the inside of the second evaporator 18.

The refrigerant is branched by the refrigerant distribution unit 16, such that the dynamic pressure of the refrigerant flowing from the diffuser portion 15d is maintained, and then the dynamic pressure is applied to the inside of the second evaporator 18. In other word, the second leading pipe 16c is connected to the second evaporator 18 without a throttle, so that the dynamic pressure can be directly applied to the inside of the second evaporator 18.

Accordingly, it is possible to apply not only the pressure difference between the static pressure of the refrigerant on the downstream side of the diffuser portion 15d and that of the refrigerant at the refrigerant suction port 15b, but also the dynamic pressure of the refrigerant on the downstream side of the diffuser portion 15d to the second evaporator 18 when causing the refrigerant to flow into the second evaporator 18. In this way, the refrigerant can surely flow into the second evaporator 18.

Since the refrigerant suction side of the compressor 11 is connected to the downstream side of the first evaporator 17, the refrigerant suction effect of the compressor 11 surely allows the refrigerant to flow into the first evaporator 17. Accordingly, both the evaporators 17 and 18 can obtain the refrigeration capacity appropriately, thereby improving the refrigeration capacity in the whole refrigerant cycle.

Furthermore, because the refrigerant suction side of the compressor 11 is connected to the downstream side of the first evaporator 17, the refrigerant whose pressure is raised by the diffuser portion 15d of the ejector 15 can be drawn into the compressor 11. This can increase the refrigerant suction pressure of the compressor 11, thereby decreasing a driving power of the compressor 11. As a result, the cycle efficiency (COP) can be improved.

The flow amount of the refrigerant flowing into the nozzle portion 15a of the ejector 15 is adjusted by the expansion valve 14 serving as the flow amount adjustment means. The ratio of a flow amount of the refrigerant flowing into the first evaporator 17 to that of the refrigerant into the second evaporator 18 is adjusted by the pipe diameter φd1 of the first leading pipe 16b and the pipe diameter φd2 of the second leading pipe 16c. Accordingly, it is possible to adjust the flow amount of the refrigerant circulating in the entire cycle with the simple cycle structure, and distribute the refrigerant appropriately into both the first and second evaporators 17 and 18.

A suction-side refrigerant circuit is formed which includes the ejector 15, the refrigerant distribution unit 16, and the second evaporator 18 via the outlet of the diffuser portion 15d and the refrigerant suction port 15b of the ejector 15. The suction-side refrigerant circuit applies the dynamic pressure of the refrigerant flow at the outlet of the diffuser portion 15d of the ejector 15 up to at least the inlet of the second evaporator 18. In this embodiment, the refrigerant distribution unit 16 is formed such that the dynamic pressure of the refrigerant flow at the outlet of the diffuser portion 15d of the ejector 15 acts on the inside of the second evaporators 8.

An outlet side flow path of the ejector 15 is provided on the upstream side of the second evaporator 18 away from the inlet thereof without a throttle device for drastically decreasing the pressure of refrigerant. As a result, the refrigerant pressure is not decreased drastically before flowing into the second evaporator 18. The outlet side flow path of the ejector 15 is configured to allow the refrigerant to flow, while reducing a change in pressure of the refrigerant. In some cases, the pressure is gradually recovered with a change in flow velocity of the refrigerant.

The refrigerant flowing into the second evaporator 18 by the dynamic pressure may have a pressure gradually decreased through a flow path part inside the evaporator 18 in a predetermined range extending along the flow direction of the refrigerant in the refrigerant flow path part, without using the throttle device. Here, the refrigerant flow path part is a part for substantially exchanging heat in the second evaporator 18. The refrigerant pressure may be gradually decreased at least over the predetermined range. Additionally, the refrigerant pressure may be gradually decreased over a wider range including the predetermined range.

In the first embodiment, the refrigerant pressure is sequentially decreased in the entire range from the inlet to the outlet of the second evaporator 18, that is, up to the refrigerant suction port 15b of the ejector 15. The predetermined range, in which the refrigerant pressure is gradually decreased, can be set near the inlet of the second evaporator 18. Alternatively, the predetermined range, in which the refrigerant pressure is gradually decreased, can be located directly after the inlet of the second evaporator 18 according to the dynamic pressure at the inlet of the second evaporator 18.

By setting one or more parts for drastically decreasing the refrigerant pressure in the second evaporator 18, the inside of the second evaporator 18 may be divided into a plurality of zones, and the most upstream zone may be set as the predetermined range.

The above-mentioned suction-side refrigerant circuit includes the refrigerant distribution unit 16. Thus, the suction-side refrigerant circuit may include a first pipe between the diffuser portion 15d and the refrigerant distribution unit 16, and a second pipe between the refrigerant distribution unit 16 and the second evaporator 18. The suction-side refrigerant circuit may be constructed by directly connecting at least two of the diffuser portion 15d, the refrigerant distribution unit 16, and the second evaporator 18 without including one or both of the first pipe and the second pipe.

The suction-side refrigerant circuit may be set to have the length, the thickness, the sectional shape, and/or the curved shape along the flow direction, such that the refrigerant reaches at least the inlet of the second evaporator 18, and further the inside of the second evaporator 18 due to the dynamic pressure of the refrigerant flow at the outlet side of the diffuser portion 15d of the ejector 15. The suction-side refrigerant circuit may be constructed to include at least a part of the diffuser portion 15d.

Second Embodiment

Figure 4:
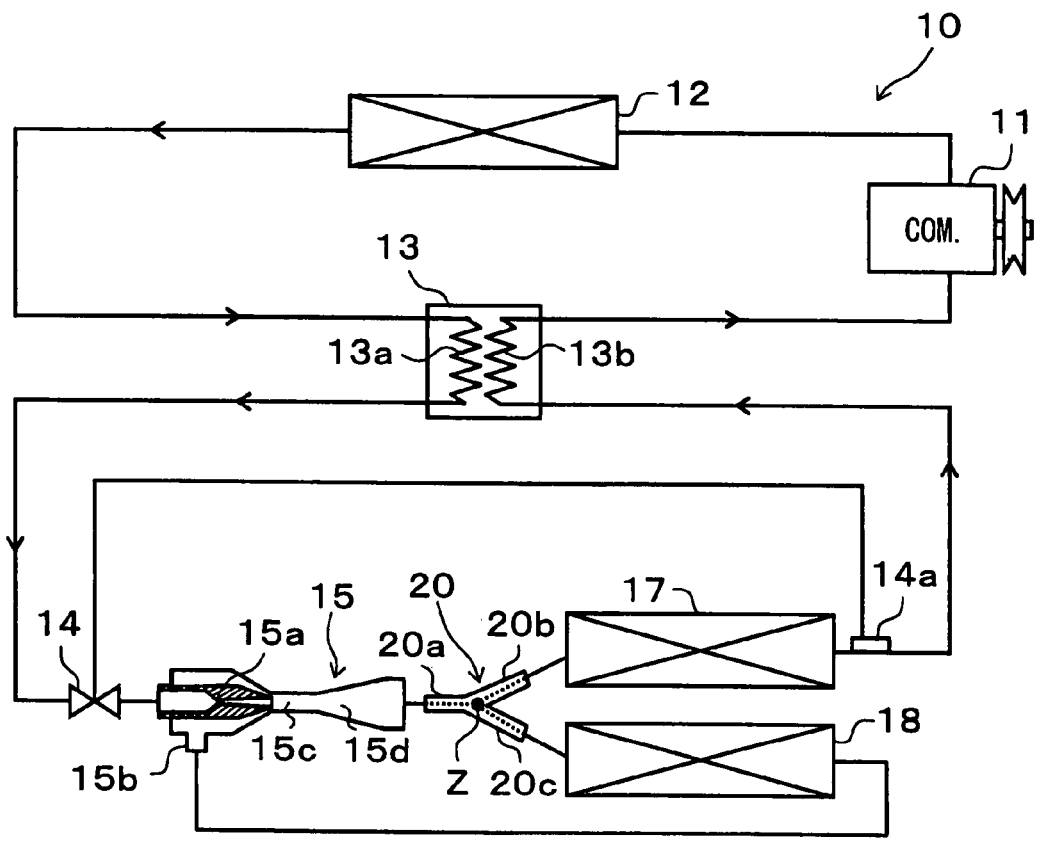
FIG. 4 is a schematic diagram showing a refrigerant cycle device having an ejector, according to a second embodiment of the present invention.
Figure 5:
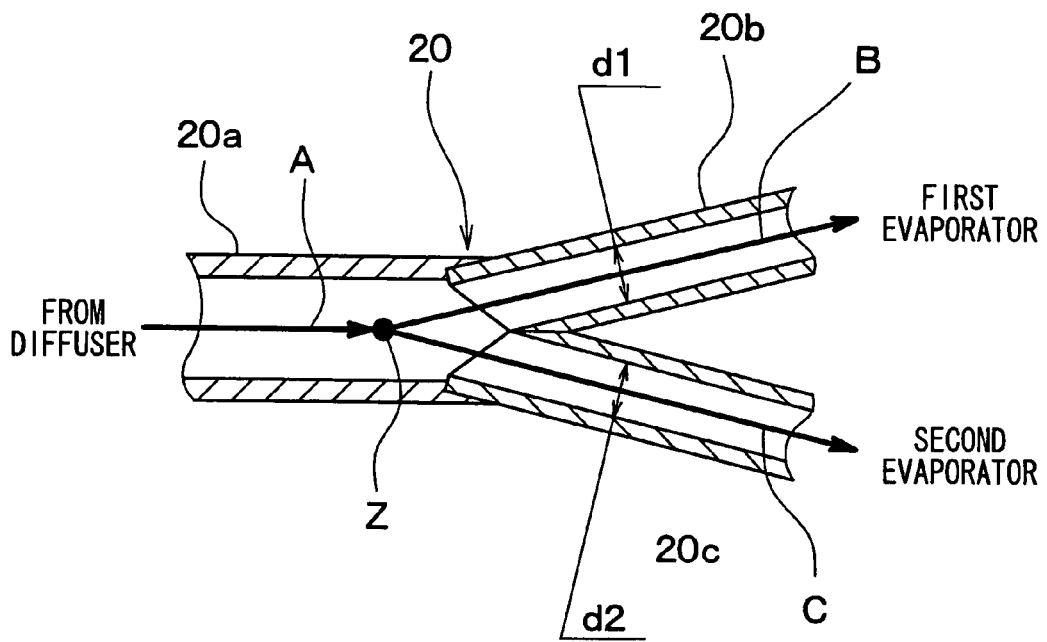
FIG. 5 is a schematic sectional view showing a refrigerant distribution unit for the refrigerant cycle device according to the second embodiment.

In the above-described first embodiment, the refrigerant distribution unit 16 having a T-shaped joint structure is employed. A refrigerant cycle device 10 of the second embodiment employs a refrigerant distribution unit 20 having a Y-shaped three-way joint structure as shown in FIGS. 4 and 5. The structures of other components in the refrigerant cycle device 10 may be the same as those in the first embodiment. FIG. 4 is a schematic diagram showing the refrigerant cycle device 10 of the second embodiment. FIG. 5 is a sectional view in the axial direction of an introduction pipe 20a of the refrigerant distribution unit 20.

The refrigerant distribution unit 20 includes, as shown in FIG. 5, the introduction pipe 20a for allowing the refrigerant to flow thereinto, a first leading pipe 20b for allowing the refrigerant to flow to the first evaporator 17, and a second leading pipe 20c for allowing the refrigerant to flow to the second evaporator 18.

Specifically, the introduction pipe 20a and the first and second leading pipes 20b and 20c are connected to each other in the following way. That is, the outflow direction of the refrigerant in the first leading pipe 20b (i.e., the direction of arrow B in FIG. 5) and the outflow direction of the refrigerant in the second leading pipe 20c (i.e., the direction of arrow C in FIG. 5) are respectively directed in predetermined directions with respect to the inflow direction of the refrigerant in the introduction pipe 20a (i.e., the direction of arrow A). Further, these outflow directions B and C are also directed to intersect at a sharp angle.

Thus, the refrigerant flowing into the introduction pipe 20a is branched by a branch portion Z formed in the connection portion between the first and second leading pipes 20b and 20c inside the refrigerant distribution unit 20, and then flows out of the first leading pipe 20b and the second leading pipe 20c.

At this time, the flow direction of the refrigerant flowing from the first leading pipe 20b (the direction of arrow B) and the flow direction of the refrigerant flowing from the second leading pipe 20c (the direction of arrow C) are connected to intersect at the sharp angle. Thus, the refrigerant having flown into the introduction pipe 20a flows from the first and second leading pipes 20b and 20c without unnecessarily decreasing the flow velocity. In this way, the dynamic pressure of the refrigerant flowing from the diffuser portion 15d of the ejector 15 is maintained even when the refrigerant flow is branched at the branch portion Z of the refrigerant distribution unit 20.

Although FIG. 4 schematically shows the cycle structure of the second embodiment, the diffuser portion 15d of the ejector 15, the refrigerant distribution unit 20, the first evaporator 17, and the second evaporator 18 can be actually connected directly to each other, or can be close to each other via short pipes. Such connection can effectively maintain the dynamic pressure of the refrigerant flowing from the ejector 15 to the first evaporator 17 and the second evaporator 18.

As mentioned above, the outflow direction of the refrigerant in the first leading pipe 20b (i.e., the direction of arrow B) and the outflow direction of the refrigerant in the second leading pipe 20c (i.e., the direction of arrow C) are respectively directed in predetermined directions with respect to the inflow direction of the refrigerant in the introduction pipe 20a (i.e., the direction of arrow A). Thus, by adjusting only the pipe diameter $\phi d1$ of the first leading pipe 20b and the pipe diameter $\phi d2$ of the second leading pipe 20c, it is easily perform an adjustment of the flow amount ratio of a flow amount of the refrigerant flowing into the first evaporator 17 to that of the refrigerant flowing into the second evaporator 18.

Accordingly, the second embodiment can be operated in the same way as the first embodiment, and thus can obtain the same effects as those of the above-described first embodiment.

Third Embodiment

Figure 6:
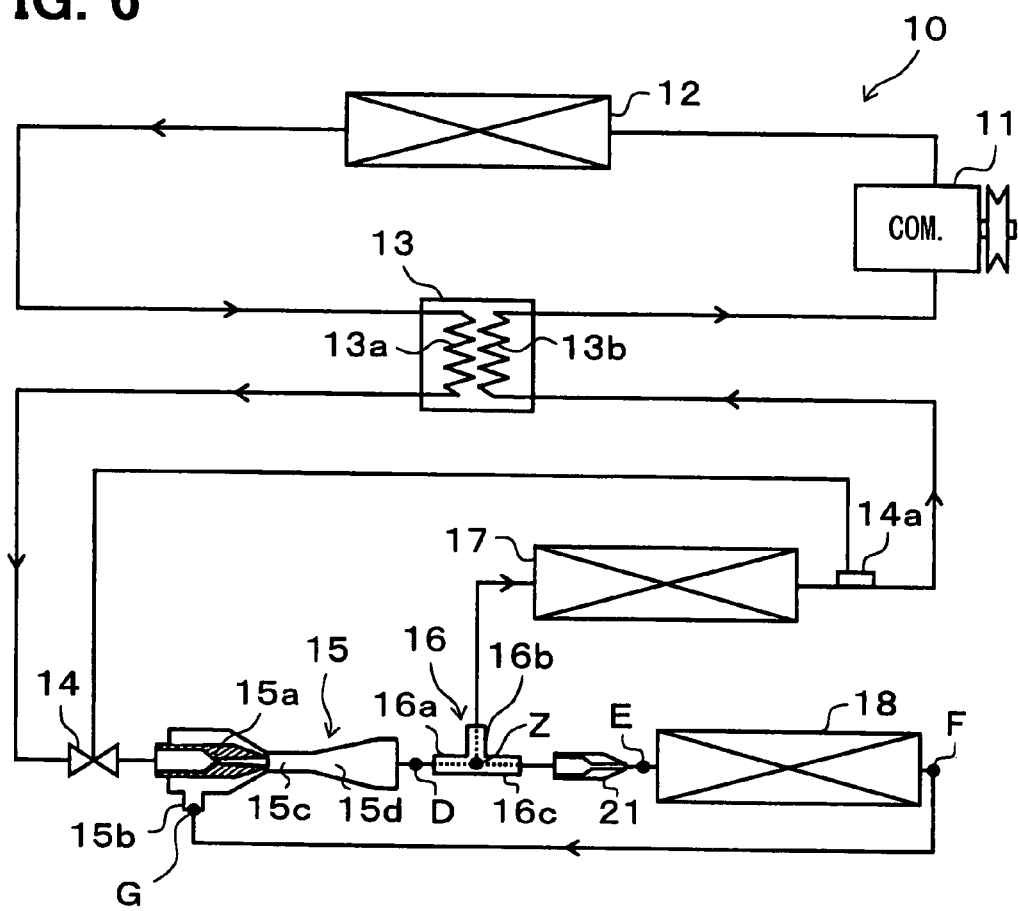
FIG. 6 is a schematic diagram showing a refrigerant cycle device having an ejector, according to a third embodiment of the present invention.

In the third embodiment, the structure of the refrigerant distribution unit 16 described in the first embodiment is used. As shown in the entire construction diagram of FIG. 6, a convergent nozzle 21 (taper nozzle) serving as a throttle device for decompressing the refrigerant is provided between the refrigerant distribution unit 16 (specifically, the second leading pipe 16c) and the second evaporator 18, in addition to the refrigerant cycle structure of the first embodiment. The static and dynamic pressures of the refrigerant at points D, E, F and G in FIG. 6 are adjusted to have the following formula F1.

Specifically, the point D is an outlet of the diffuser portion 15d of the ejector 15, the static pressure of the refrigerant at the point D (i.e., the refrigerant at the outlet of the diffuser portion 15d) is Ps1, and the dynamic pressure thereof is Pv1. The point E is an inlet of the second evaporator 18, the static pressure of the refrigerant at the point E (i.e., refrigerant at the inlet of the second evaporator 18) is Ps2, and the dynamic pressure thereof is Pv2. The point F is an outlet of the second evaporator 18, and the static pressure of the refrigerant at the point F (i.e., refrigerant at the outlet of the second evaporator 18) is Ps3. The point G is the refrigerant suction port 15b of the ejector 15, and the static pressure of the refrigerant at the point G is Ps4. The target flow amount of refrigerant sucked from the refrigerant suction port 15b can be adjusted to have the following relationship:

$$(Ps1-Ps4)+Pv1 \geq (Ps1-Ps2)+(Ps2-Ps3)+(Ps3-Ps4)+Pv2 \quad (F1)$$

In the formula F1, the term "Ps1−Ps4" means an amount of increase in pressure Psej by the ejector 15, and the term "Ps1−Ps2" means a loss of pressure in the refrigerant flow path from the diffuser portion 15d to the second evaporator 18. That is, the term "Ps1−Ps2" includes a loss of pressure in the refrigerant distribution unit 16 and an amount of decrease in pressure in the convergent nozzle 21.

The term "Ps2−Ps3" means a loss of pressure between the refrigerant inlet and outlet of the second evaporator 18, and the term "Ps3−Ps4" means a loss of pressure in the refrigerant flow path from the second evaporator 18 to the refrigerant suction port 15b.

Thus, the formula F1 means that a value obtained by subtracting the total value of pressure losses in the refrigerant flow paths from the diffuser portion 15d to the refrigerant suction port 15b from the total value of the pressure increase amount Psej of the ejector 15 and the dynamic pressure Pv1 of the refrigerant at the outlet of the diffuser portion 15d is equal to larger than the dynamic pressure Pv2 of the refrigerant at the inlet of the second evaporator 18.

That is, the static and dynamic pressures of the refrigerant at the respective points D to G are adjusted to have the relationship represented by the formula F1, so that the dynamic pressure of the refrigerant at the inlet of the second evaporator 18 can be applied when the refrigerant flows into the second evaporator 18.

In the third embodiment, the refrigerant distribution unit 16 is used to branch the refrigerant flow while the dynamic pressure of the refrigerant from the ejector 15 can be maintained without unnecessarily decreasing the flow velocity of the refrigerant during the branching of the refrigerant flow. The adjustment of the static and dynamic pressures of the refrigerant at the respective points D to G can be easily performed, by arranging the refrigerant distribution unit 16 and the second evaporator 18 such that they are located close to each other, and by appropriately adjusting the refrigerant passage area of the convergent nozzle 21.

Although in the third embodiment, the convergent nozzle 21 is used as the throttle device, a Laval nozzle may be adopted. Generally, the Laval nozzle includes a throat portion located in the midway of the refrigerant passage to have smallest passage area, and a wide end portion having an inside diameter being gradually increased after the throat portion. The structures of other components may be the same as those in the first embodiment.

Figure 7:
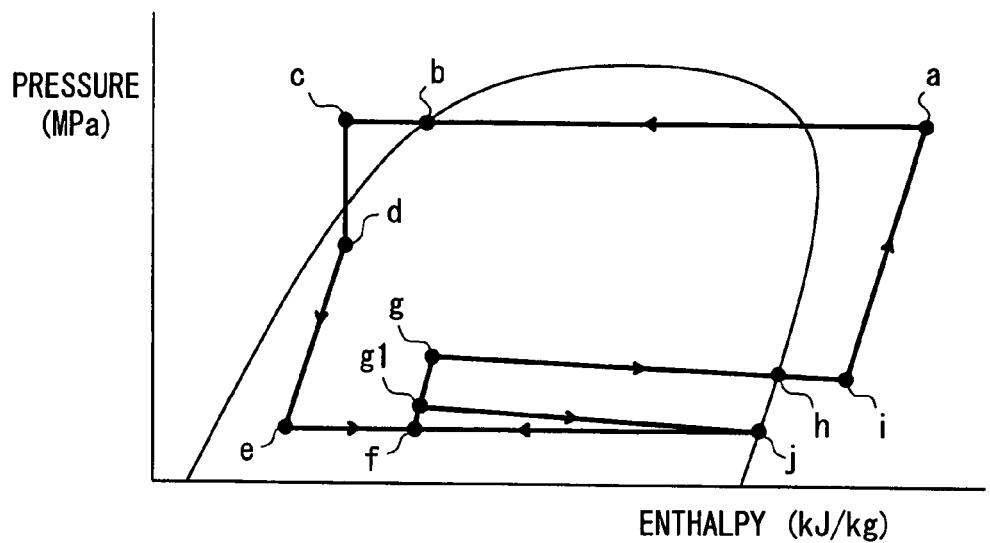
FIG. 7 is a Mollier diagram showing a refrigerant state in a refrigerant cycle according to the third embodiment.

Now, operation of the refrigerant cycle device 10 of the third embodiment with the above-mentioned structure will be described with reference to FIG. 7. FIG. 7 is a Mollier diagram schematically showing the states of the refrigerant in the refrigerant cycle device 10 of the third embodiment.

When the compressor 11 is driven by the vehicle engine, the refrigerant flowing from the first leading pipe 16b to the first evaporator 17 after being branched by the branch portion Z circulates through the compressor 11, the radiator 12, the internal heat exchanger 13, the expansion valve 14, the ejector 15, the first evaporator 17, and the compressor 11 in that order (which corresponds to changes from a point "a" to a point "b", a point "c", a point "d", a point "e", a point "f", a point "g", a point "h", a point "i", and then the point "a" of FIG. 7). Accordingly, the cooling effect can be obtained at the first evaporator 17.

The other refrigerant branched by the branch portion Z flows from the second leading pipe 16c to be decompressed by the convergent nozzle 21 (which corresponds to a change from the point "g" to a point "g1" of FIG. 7). At this time, in this embodiment, the use of the convergent nozzle 21 as the decompression means tends to decrease the flow velocity of the refrigerant in the decompression and expansion process. This can make it difficult for the dynamic pressure of the refrigerant at the inlet side of the second evaporator 18 to be decreased, and can decompress and expand the refrigerant substantially isentropically.

The refrigerant decompressed and expanded by the convergent nozzle 21 flows into the second evaporator 18, and absorbs heat from the blown air from the blower fan to evaporate (which corresponds to a change from the point "g9" to a point "j" in FIG. 7). Then, the refrigerant is sucked from the refrigerant suction port 15b into the ejector 15 (which corresponds to a change from the point "j" to the point "f" in FIG. 7).

As mentioned above, in the third embodiment, the static and dynamic pressures of the refrigerant at the respective points D to G can be adjusted to have the relationship represented by the formula F1. Accordingly, when the refrigerant flows into the second evaporator 18, the dynamic pressure of the refrigerant at the inlet of the second evaporator 18 can act to surely allow the refrigerant to flow into the second evaporator 18. As a result, the third embodiment can obtain the same effects as those of the first embodiment.

The decompression effect of the convergent nozzle 21 can effectively decrease the refrigerant evaporation pressure (i.e., refrigerant evaporation temperature) of the second evaporator 18 with respect to the refrigerant evaporation pressure (i.e., refrigerant evaporation temperature) of the first evaporator 17. Since the refrigerant is decompressed and expanded isentropically by the convergent nozzle 21, a difference in enthalpy between the inlet and outlet of the second evaporator 18 can be enlarged to further enable improvement of the refrigeration capacity of the second evaporator 18.

Fourth Embodiment

In the above-described third embodiment, the convergent nozzle 21 is disposed between the refrigerant distribution unit 16 and the second evaporator 18. However, in the fourth embodiment, as shown in the entire construction diagram of FIG. 8, an upstream evaporating portion 18a and a downstream evaporation portion 18b connected in series in a refrigerant flow are employed as the second evaporator 18, and the same convergent nozzle 21 as that of the third embodiment is disposed between the two evaporating portions 18a and 18b.

Figure 8:
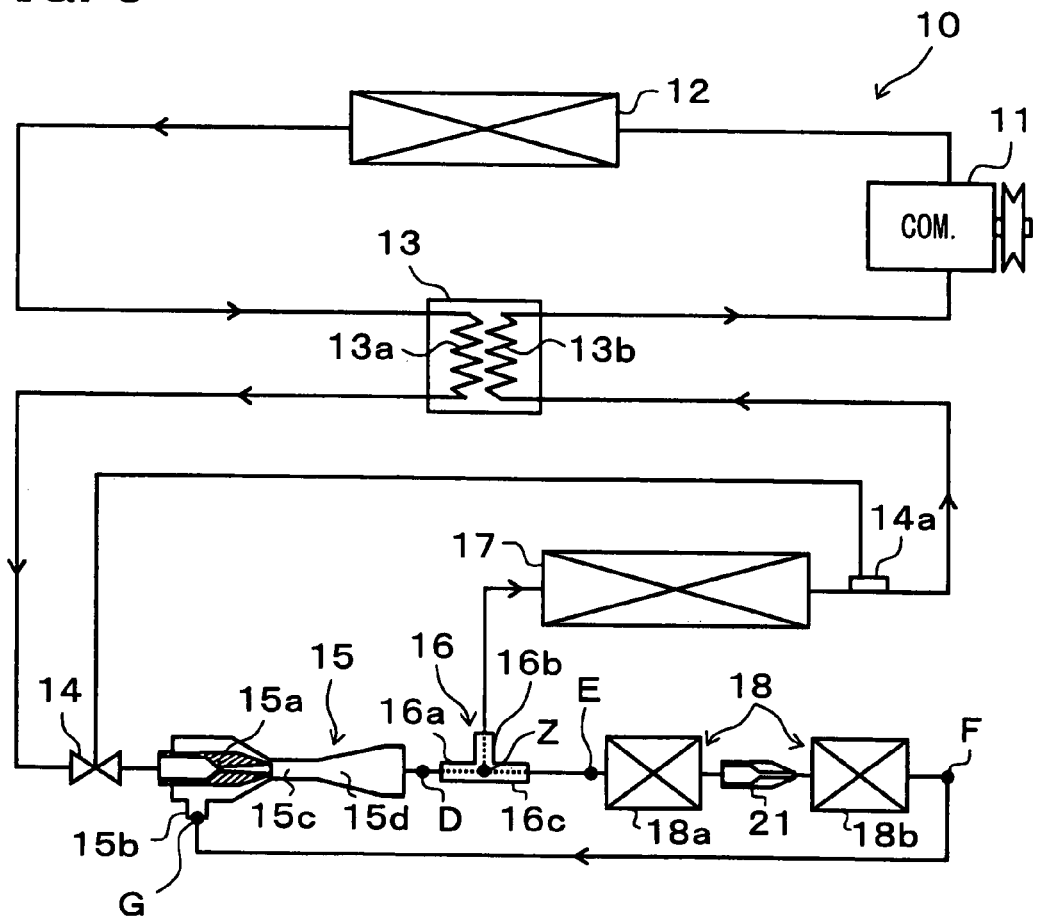
FIG. 8 is a schematic diagram showing a refrigerant cycle device having an ejector, according to a fourth embodiment of the present invention.

The static and dynamic pressures of the refrigerant at the points D, E, F and G in FIG. 8 are adjusted to have the relationship represented by the formula F1 of the above-described third embodiment. The structures of other components may be the same as those of the third embodiment.

Figure 9:
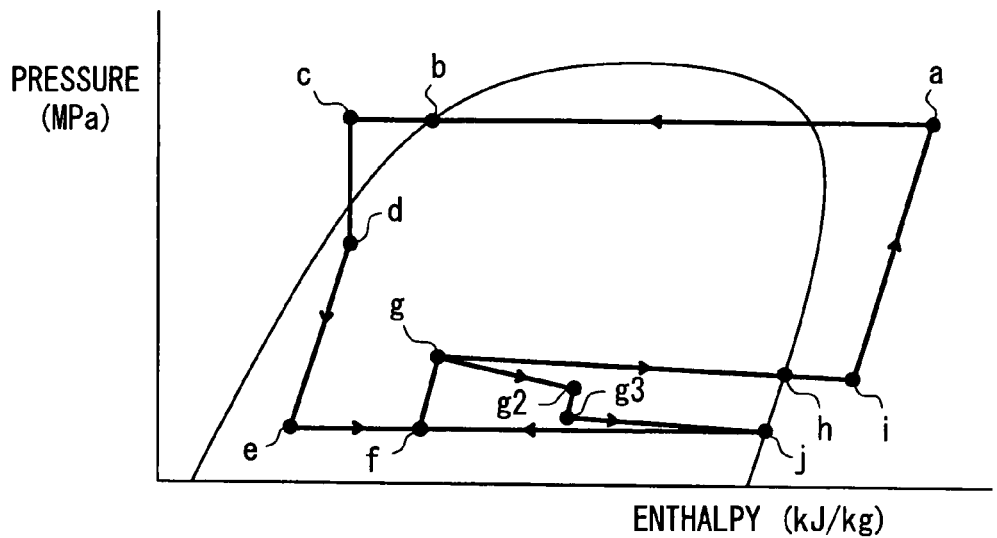
FIG. 9 is a Mollier diagram showing a refrigerant state in a refrigerant cycle according to the fourth embodiment.

Now, the operation of a refrigerant cycle device 10 of the fourth embodiment with the above-mentioned structure of FIG. 8 will be described with reference to FIG. 9. FIG. 9 is a Mollier diagram schematically showing the states of the refrigerant in the refrigerant cycle device 10 of the fourth embodiment.

When the compressor 11 is driven by the vehicle engine, the refrigerant flowing from the first leading pipe 16b to the first evaporator 17 after being branched by the branch portion Z circulates through the compressor 11, the radiator 12, the internal heat exchanger 13, the expansion valve 14, the ejector 15, the first evaporator 17, and the compressor 11 in that order (which corresponds to changes from a point "a" to a point "b", a point "c", a point "d", a point "e", a point "f" a point "g", a point "h", a point "i", and then the point "a" in FIG. 9). This exhibits the cooling effect at the first evaporator 17 in this refrigerant cycle of the compressor 11.

The other refrigerant branched by the branch portion Z flows from the second leading pipe 16c into the upstream evaporating portion 18a of the second evaporator 18. The refrigerant flowing into the upstream evaporating portion 18a absorbs heat from the blown air by the blower fan to evaporate, while gradually decreasing the pressure due to the pressure loss inside the upstream evaporating portion 18a and the suction effect of the ejector 15 (which corresponds to a change from the point "g" to a point "g2" in FIG. 9).

The refrigerant flowing from the upstream evaporating portion 18a is decompressed by the convergent nozzle 21 (which corresponds to a change from the point "g2" to a point "g3" in FIG. 9). Then, the refrigerant flows into the downstream evaporating portion 18b from the convergent nozzle 21, and absorbs heat from the blown air by the blower fan to evaporate (which corresponds to a change from the point "g3" to a point "j" in FIG. 9). The refrigerant flowing from the downstream evaporating portion 18b is drawn from the refrigerant suction port 15b into the ejector 15 (which corresponds to a change from the point "j" to the point "f" in FIG. 9).

As mentioned above, in the fourth embodiment, the dynamic pressure tends to be applied easily to the upstream evaporating portion 18a disposed on the upstream side of the convergent nozzle 21 of the second evaporator 18, which can obtain the same effect as that of the first embodiment. Furthermore, the downstream evaporating portion 18b disposed on the downstream side of the convergent nozzle 21 can further decrease the refrigerant evaporation pressure (refrigerant evaporation temperature) by the decompression effect of the convergent nozzle 21, thereby it can obtain the same effect as that of the third embodiment.

Fifth Embodiment

The above-described first embodiment has described an example in which the thermal expansion valve 14 is adopted as the flow amount adjustment means for adjusting the refrigerant flow amount to the nozzle portion 16a. However, the fifth embodiment will describe an example in which an expansion valve 22 is employed and an accumulator 23 is disposed on a downstream side of the first evaporator 17 as shown in FIG. 10.

The expansion valve 22 is a thermal expansion valve, like the expansion valve 14. The thermal expansion valve 22 has a temperature sensing portion 22a disposed on the downstream side of the second evaporator 18. The accumulator 23 is a vapor/liquid separator for separating the refrigerant into liquid and vapor phases, and for allowing the vapor-phase refrigerant separated to flow into the suction side of the compressor 11. The structures of other components in the refrigerant cycle may be the same as those of the first embodiment.

Figure 10:
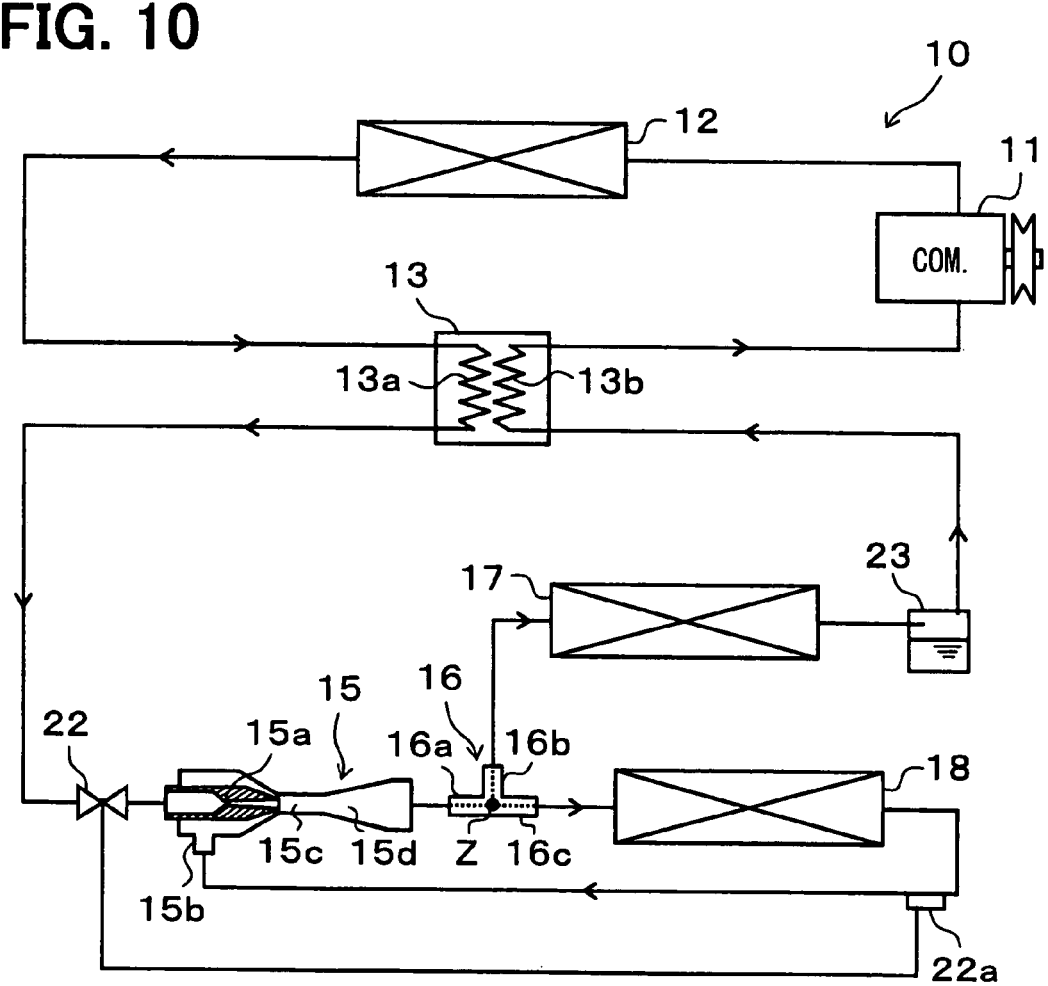
FIG. 10 is a schematic diagram showing a refrigerant cycle device having an ejector, according to a fifth embodiment of the present invention.

The refrigerant cycle device with the above-mentioned structure of the fifth embodiment shown in FIG. 10 can also be operated to obtain the same effects as those of the first embodiment. The refrigerant flow amount to the nozzle portion 15a is adjusted by the expansion valve 22, which can adjust the flow amount of refrigerant circulating through the entire cycle with the simple cycle structure. The vapor-phase refrigerant is supplied to the suction side of the compressor 11 via the accumulator 23. Therefore, it can prevent a problem of compressor liquid back.

In the refrigerant cycle device 10 of the fifth embodiment, the refrigerant distribution unit 16 described in the above-described first embodiment is used. However, the refrigerant distribution unit 20 described in the second embodiment may be used instead of the refrigerant distribution unit 16, in the refrigerant cycle device 10 of the fifth embodiment.

Sixth Embodiment

Figure 11:
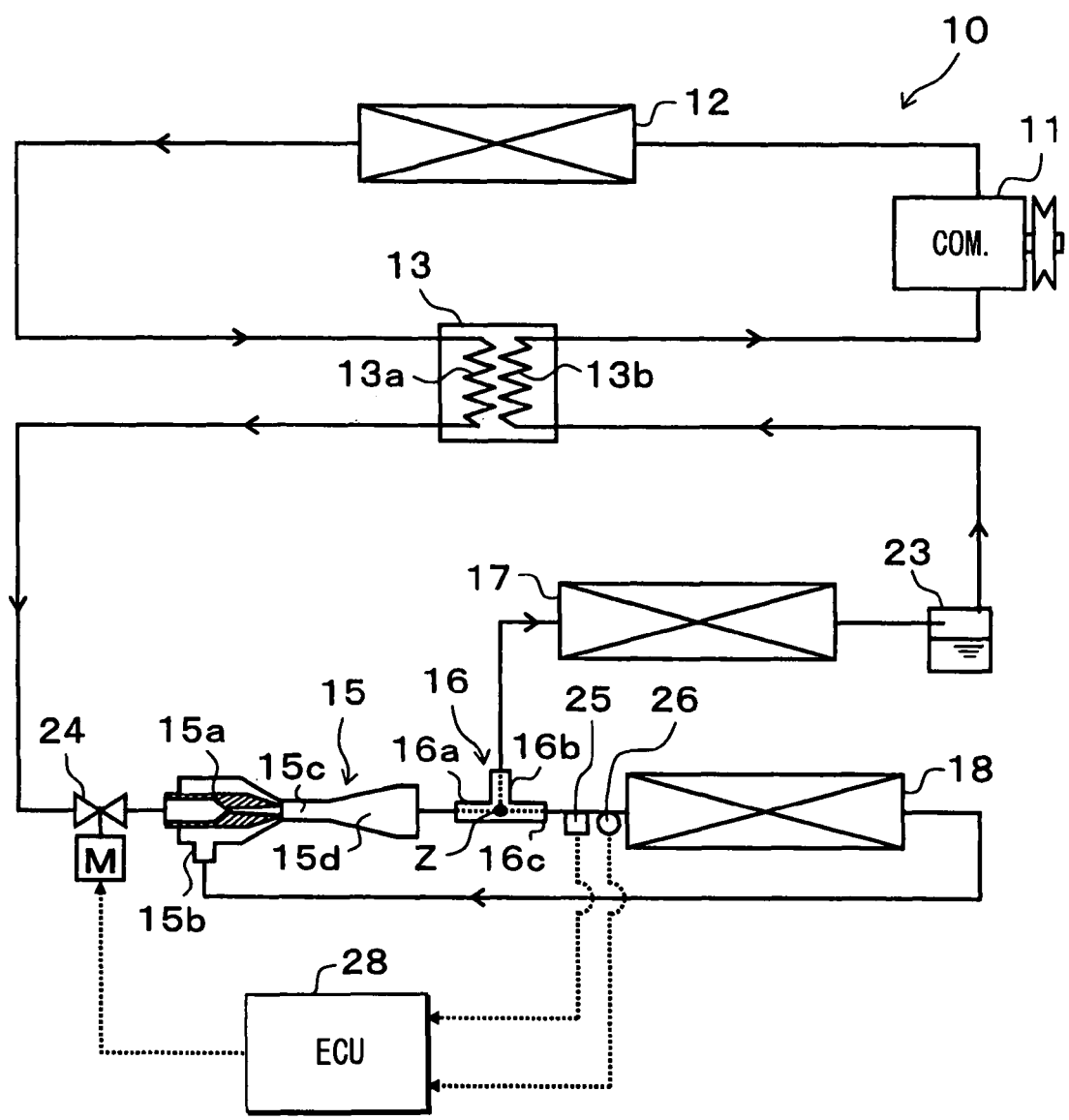
FIG. 11 is a schematic diagram showing a refrigerant cycle device having an ejector, according to a sixth embodiment of the present invention.

Although the fifth embodiment has described the example of adoption of the expansion valve 22 as the flow amount adjust means, as shown in the entire construction diagram of FIG. 11, the sixth embodiment will describe an example of a refrigerant cycle device 10 which employs an electric expansion valve 24. The refrigerant cycle device 10 also includes a pressure sensor 25 serving as a pressure detecting unit for detecting the refrigerant pressure on the inlet side of the second evaporator 18, and a temperature sensor 26 serving as a temperature detecting unit for detecting the refrigerant temperature on the inlet side of the second evaporator 18. The refrigerant cycle device 10 further includes a controller 28 (ECU) for controlling an operation of the electric expansion valve 24 based on the detection signals of the pressure sensor 25 and the temperature sensor 26.

The refrigerant cycle device 10 of the sixth embodiment constitutes a super-critical cycle in which high-pressure side refrigerant pressure before being decompressed is equal to or higher than the critical pressure of the refrigerant, using carbon dioxide as the refrigerant, for example. Thus, the radiator 12 does not condense the refrigerant while cooling the refrigerant. Therefore, a liquid receiver is unnecessary to be located at the refrigerant outlet side of the radiator 12.

The controller 28 has an input side for reading detection signals from the pressure sensor 25 and the temperature sensor 26, as well as an output side connected to the electric expansion valve 24. The controller 28 determines a target pressure by using a control map previously stored, based on the temperature detected by the temperature sensor 26. The controller 28 controls a valve opening degree of the electric expansion valve 24 such that the detected pressure by the pressure sensor 25 approaches the target pressure, thereby adjusting the flow amount of the refrigerant flowing into the nozzle portion 15a of the ejector 15.

The structures of other components may be the same as those of the fifth embodiment. The refrigerant cycle device 10 with this structure of the above-mentioned sixth embodiment can also be operated to obtain the same effects as those of the first embodiment.

In the refrigerant cycle device 10 of the sixth embodiment, the refrigerant distribution unit 16 described in the above-described first embodiment is used. However, the refrigerant distribution unit 20 described in the second embodiment may be used instead of the refrigerant distribution unit 16, in the refrigerant cycle device 10 of the sixth embodiment.

Seventh Embodiment

Figure 12:
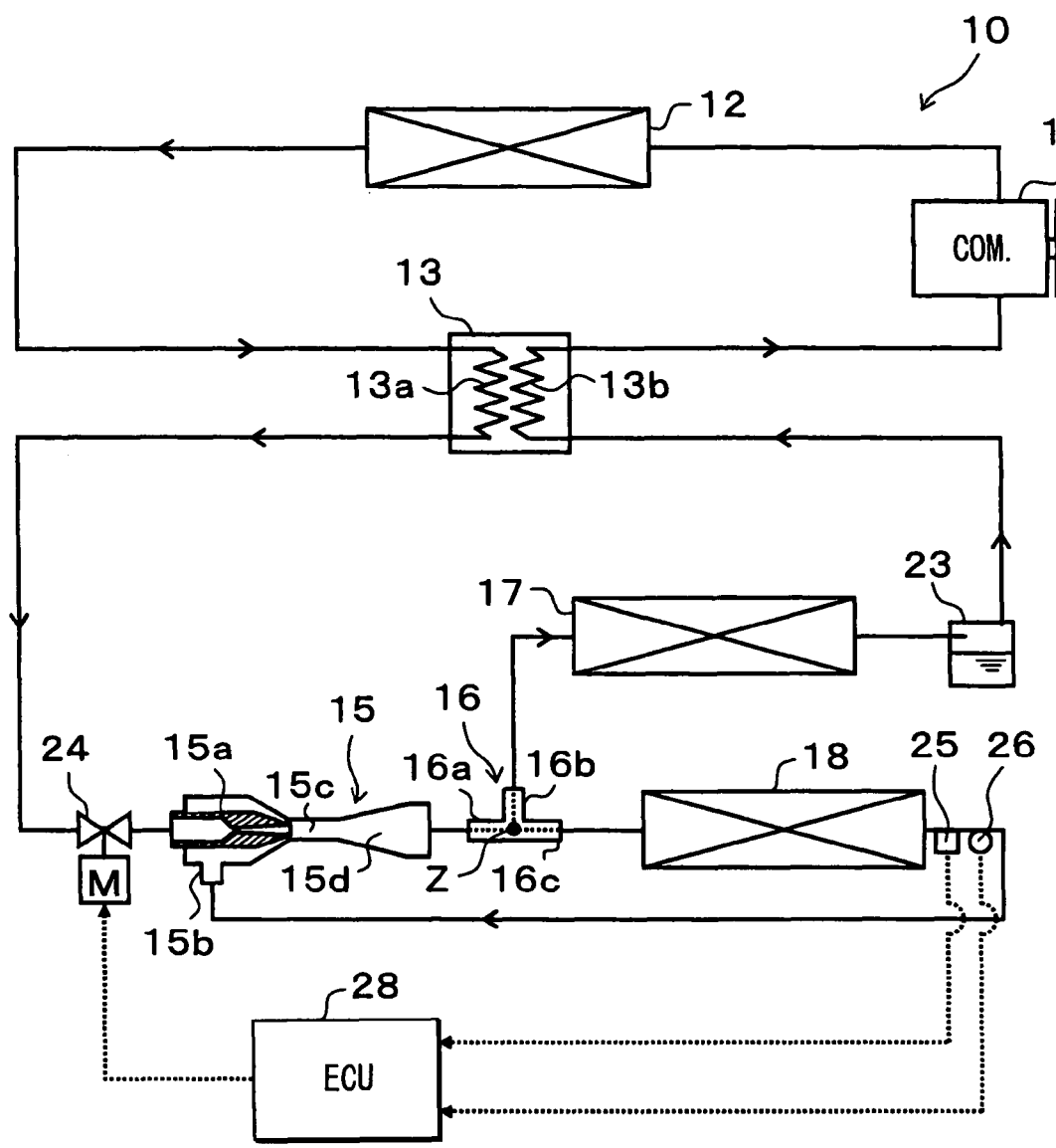
FIG. 12 is a schematic diagram showing a refrigerant cycle device having an ejector, according to a seventh embodiment of the present invention.

In the above-described sixth embodiment, the pressure and temperature of the refrigerant on the inlet side of the second evaporator 18 are detected by using the sensors 25 and 26. In contrast, in the seventh embodiment, as shown in the entire construction diagram of FIG. 12, a refrigerant cycle device 10 includes a pressure sensor 25 serving as a pressure detecting unit for detecting the refrigerant pressure on the outlet side of the second evaporator 18, and a temperature sensor 26 serving as a temperature detecting unit for detecting the refrigerant temperature on the outlet side of the evaporator 18. The structures of other components may be the same as those of the sixth embodiment.

The refrigerant cycle device with the above-mentioned structure of the seventh embodiment can also be operated to obtain the same effects as those of the fifth embodiment. In this embodiment, the controller 28 may control the valve opening degree of the electric expansion valve 24 such that the detected temperature by the temperature sensor 26 is the target temperature previously determined, thereby adjusting the flow amount of the refrigerant flowing into the nozzle portion 15a of the ejector 15.

In the refrigerant cycle device 10 of the seventh embodiment, the refrigerant distribution unit 16 described in the above-described first embodiment is used. However, the refrigerant distribution unit 20 described in the second embodiment may be used instead of the refrigerant distribution unit 16, in the refrigerant cycle device 10 of the seventh embodiment.

Eighth Embodiment

Figure 13:
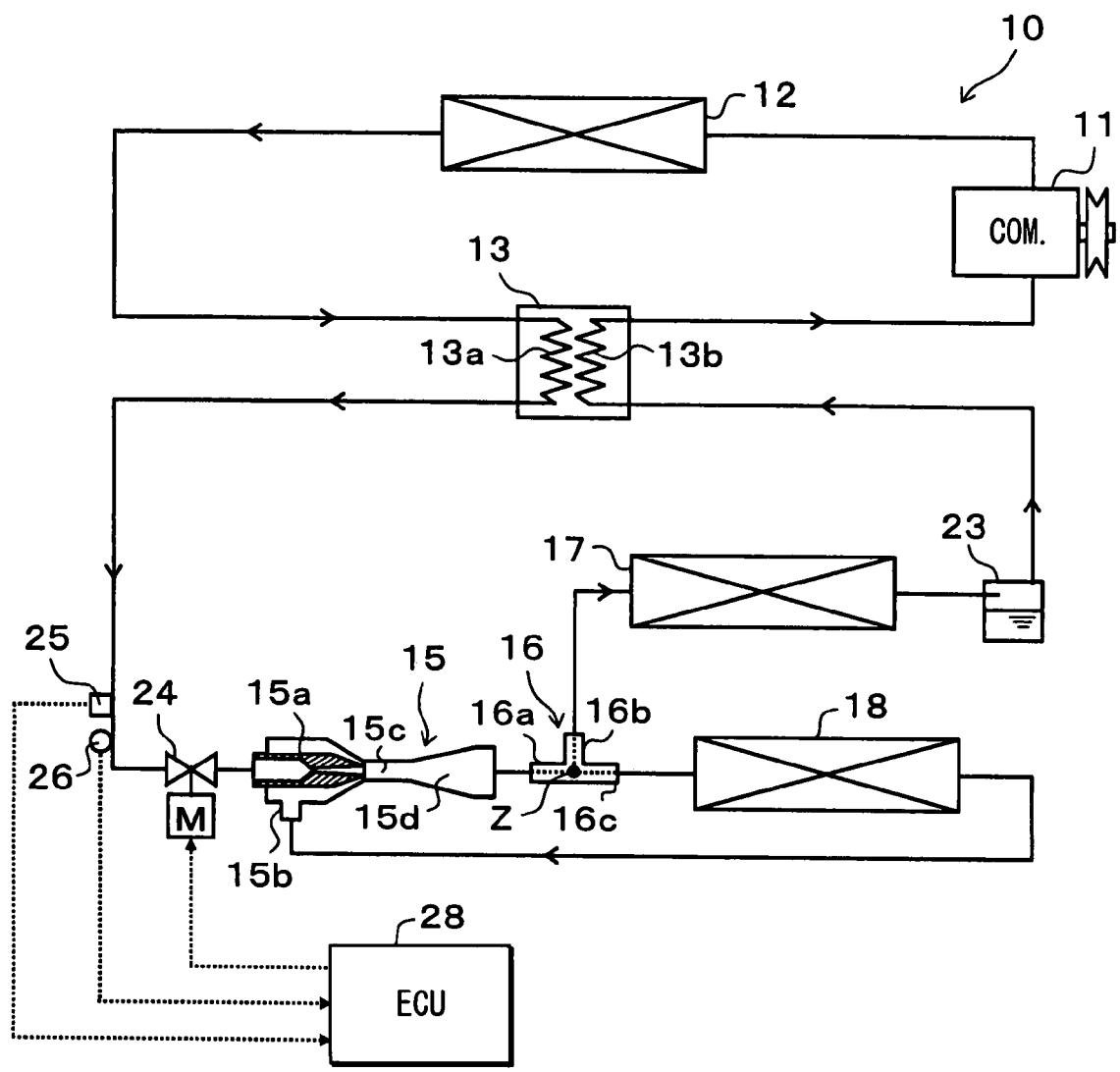
FIG. 13 is a schematic diagram showing a refrigerant cycle device having an ejector, according to an eighth embodiment of the present invention.

In the above-described sixth embodiment, the pressure and temperature of the refrigerant on the inlet side of the second evaporator 18 are detected by using the sensors 25, 26. In contrast, in the eighth embodiment, as shown in the entire construction diagram of FIG. 13, a refrigerant cycle device 10 includes a pressure sensor 25 serving as a pressure detecting unit for detecting the refrigerant pressure on an upstream side of the electric expansion valve 24, and a temperature sensor 26 serving as a temperature detecting unit for detecting a refrigerant temperature on the upstream side of the electric expansion valve 24. The structures of other components may be the same as those of the sixth embodiment.

Also, in operating the refrigerant cycle device 10 with this structure of this embodiment, the controller 28 can determine a target pressure by using a control map previously stored, based on the temperature detected by the temperature sensor 26. Further, the controller 28 can control the valve opening degree of the electric expansion valve 24 such that the detected pressure by the pressure sensor 25 approaches the target pressure, thereby adjusting the flow amount of the refrigerant flowing into the nozzle portion 15a. This can obtain the same effects as those of the above-described fifth embodiment.

In the refrigerant cycle device 10 of the eighth embodiment, the refrigerant distribution unit 16 described in the above-described first embodiment is used. However, the refrigerant distribution unit 20 described in the second embodiment may be used instead of the refrigerant distribution unit 16, in the refrigerant cycle device 10 of the eighth embodiment.

Ninth Embodiment

A ninth embodiment of the present invention will be described with reference to FIG. 14. In this embodiment, as shown in the entire construction diagram of FIG. 14, a branch portion Y for branching a refrigerant flow is provided on a downstream side of the radiator 12 and on an upstream side of the expansion valve 14 in the structure of the refrigerant cycle device 10 of the third embodiment. A bypass passage 30 is provided for guiding the refrigerant from the branch portion Y to a portion between a downstream side of the first evaporator 17 and an upstream side of the low-pressure side refrigerant flow path 13b of the internal heat exchanger 13.

In the bypass passage 30, a throttle device 31 for decompressing and expanding the refrigerant, and a third evaporator 32 for evaporating the refrigerant flowing from the throttle device 31 are disposed. The third evaporator 32 is a heat exchanger for heat radiation that exchanges heat between the refrigerant on the downstream side of the throttle device 31 and the air blown by a blower fan (not shown) for the third evaporator 32 to allow the low-pressure refrigerant to evaporate, thereby exhibiting a heat absorption effect.

As the throttle device 31 can be employed a fixed throttle, such as a capillary tube, or an orifice. Alternatively, an electric variable throttle may be used as the throttle device 31. The structures of other components are the same as those of the third embodiment. Furthermore, in the ninth embodiment, the first evaporator 17 and the second evaporator 18 can be used for air conditioning for front seats of a vehicle, and the third evaporator 32 can be used for air conditioning for rear seats of the vehicle.

The refrigerant cycle device 10 with the above-mentioned structure of the ninth embodiment can also be operated to obtain the same effects as those of the third embodiment. The refrigerant branched at the branch portion Y absorbs heat in the third evaporator 32 and is evaporated. Thus, the first to third evaporators 17, 18, and 32 can obtain the cooling effects at the same time.

Figure 14:
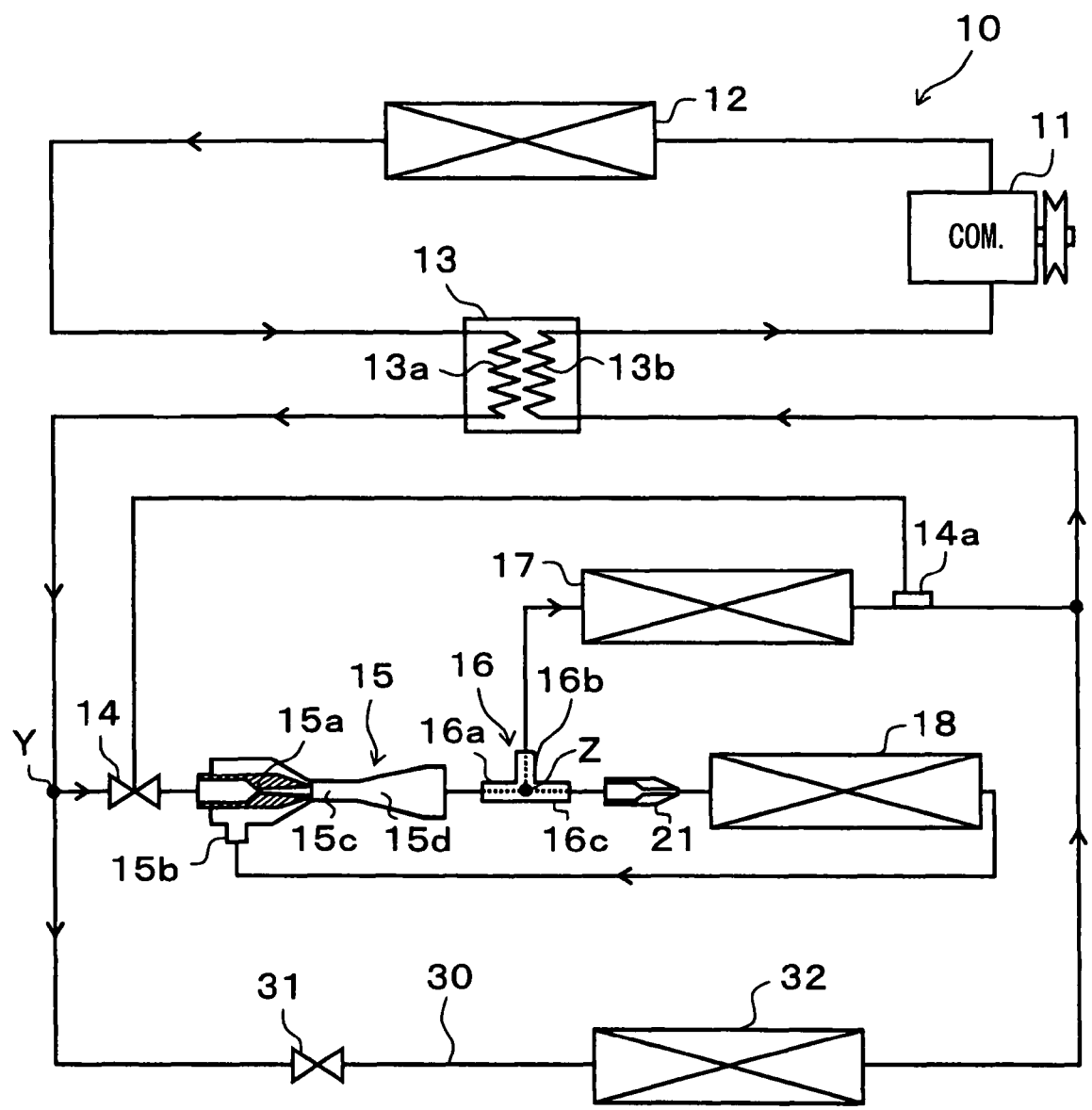
FIG. 14 is a schematic diagram showing a refrigerant cycle device having an ejector, according to a ninth embodiment of the present invention.

As shown in FIG. 14, the third evaporator 32 is connected in parallel to the ejector 15 and the first evaporator 17. Thus, the refrigerant discharging and suction capacities of the compressor 11 can be used for allowing the refrigerant to flow into the third evaporator 32, thereby the refrigerant can surely flow also into the third evaporator 32 to have the refrigeration capacity.

In the refrigerant cycle device 10 of the ninth embodiment, the refrigerant distribution unit 16 described in the above-described first embodiment is used. However, the refrigerant distribution unit 20 described in the second embodiment may be used instead of the refrigerant distribution unit 16, in the refrigerant cycle device 10 of the ninth embodiment.

Tenth Embodiment

Figure 15:
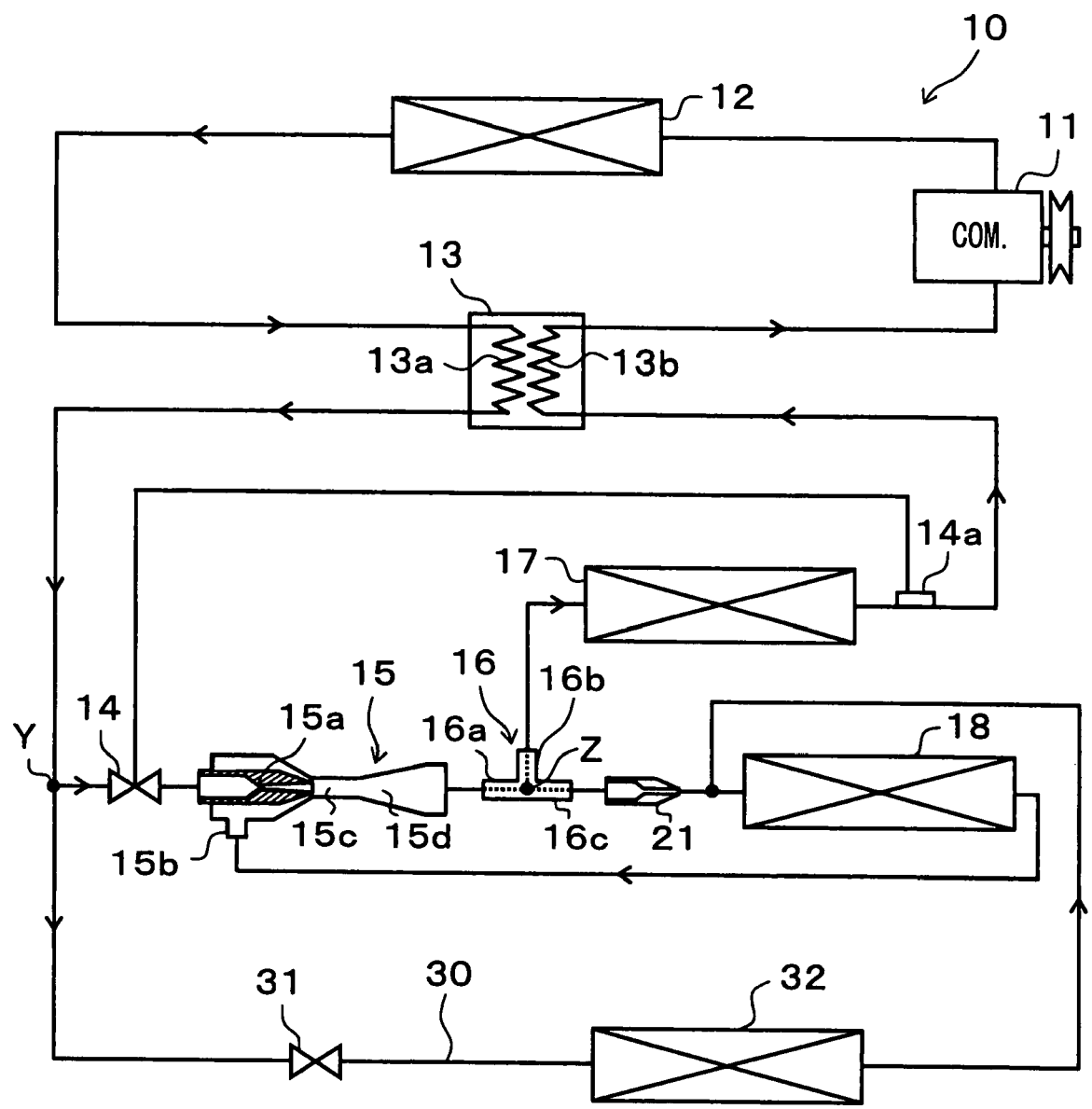
FIG. 15 is a schematic diagram showing a refrigerant cycle device having an ejector, according to a tenth embodiment of the present invention.

A tenth embodiment of the present invention will be now described with reference to FIG. 15. As shown in the entire construction diagram of FIG. 15, the tenth embodiment differs from the refrigerant cycle device 10 of the ninth embodiment in the bypass passage 30. Specifically, in the tenth embodiment, the bypass passage 30 branched from the branch portion Y is connected so as to allow the refrigerant after passing through the third evaporator 32 to be guided to a position between a downstream side of the convergent nozzle 21 and an upstream side of the second evaporator 18. The structures of other components are the same as those of the ninth embodiment.

The third evaporator 32 has a downstream side in the bypass passage 30, connected between the refrigerant distribution unit 16 and the second evaporator 18, so as to apply a suction pressure of the refrigerant suction port 15b of the ejector 15 to the third evaporator 32. Thus, the refrigerant evaporation pressure (refrigerant evaporation temperature) of the third evaporator 32 can be set low as compared to that of the first evaporator 17.

In the tenth embodiment, the refrigerant cycle device 10 can be applied to a freezer and refrigerator for a vehicle. In this case, the first evaporator 17 is used for cooling a refrigerating chamber, and the second evaporator 18 and the third evaporator 32 in which refrigerant evaporation temperature is lower than that of the first evaporator 17 are used for cooling a freezing chamber, in the freezer and refrigerator.

The refrigerant cycle device 10 with the above-mentioned structure of this embodiment can also be operated to simultaneously obtain the cooling effects at the first to third evaporators 17, 18, and 32, like the ninth embodiment. Although in this embodiment the convergent nozzle 21 is provided, a check valve for permitting the refrigerant to flow only from the refrigerant distribution unit 16 to the second evaporator 18 (i.e., to the side of the refrigerant suction port 15b) may be provided instead of the convergent nozzle 21, or in series with the convergent nozzle 21.

In the refrigerant cycle device 10 of the tenth embodiment, the refrigerant distribution unit 16 described in the above-described first embodiment is used. However, the refrigerant distribution unit 20 described in the second embodiment may be used instead of the refrigerant distribution unit 16, in the refrigerant cycle device 10 of the tenth embodiment.

Eleventh Embodiment

An eleventh embodiment of the present invention will be now described with reference to FIG. 16.

Figure 16:
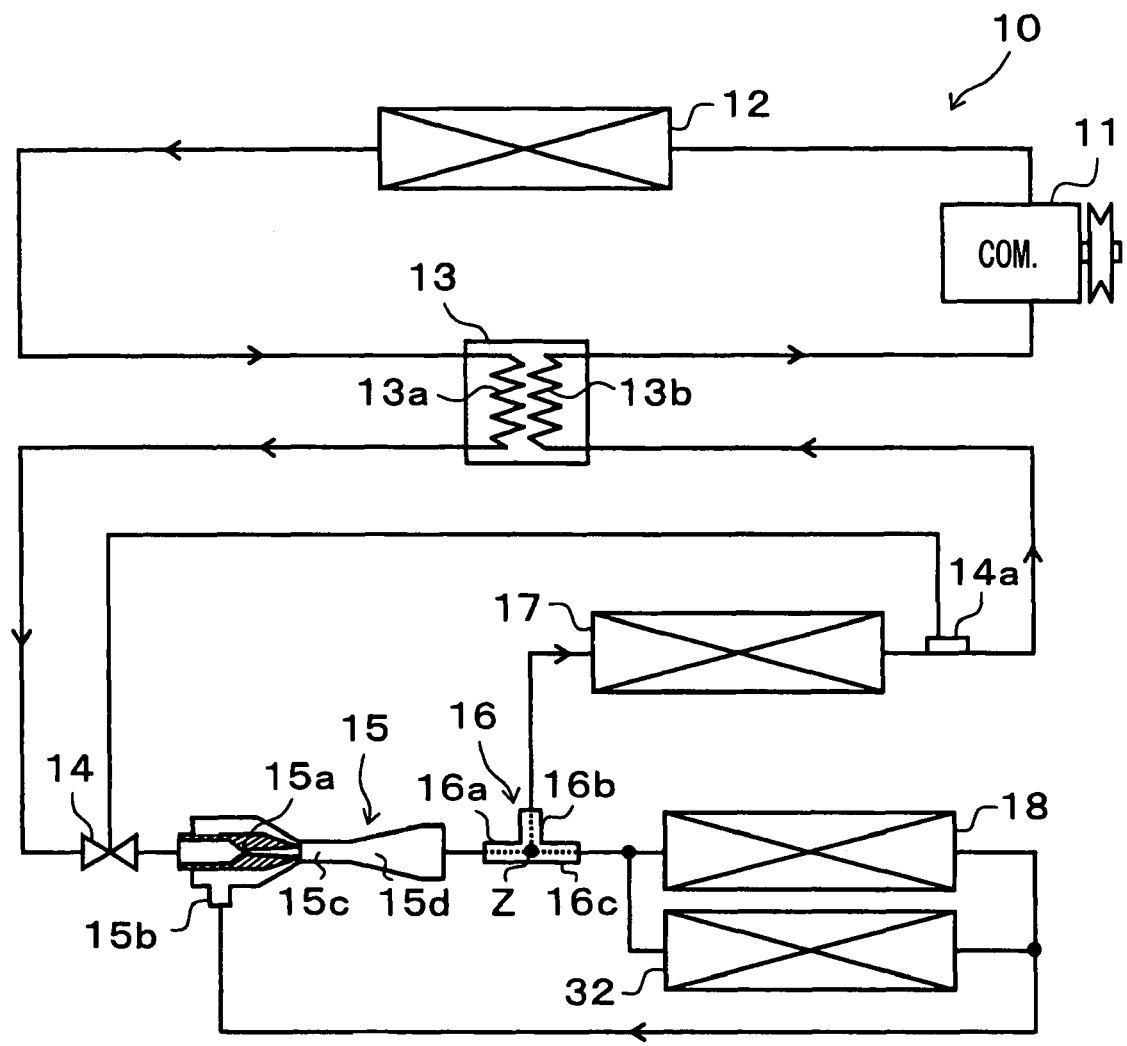
FIG. 16 is a schematic diagram showing a refrigerant cycle device having an ejector, according to an eleventh embodiment of the present invention.

As shown in the entire construction diagram of FIG. 16, the eleventh embodiment differs from the structure of the first embodiment in that the third evaporator 32 is disposed in parallel to the second evaporator 18. That is, the refrigerant flowing out of the second leading pipe 16c of the refrigerant distribution unit 16 flows into both the second evaporator 18 and the third evaporator 32 in parallel, and is joined to be drawn into the refrigerant suction port 15b of the ejector 15. The other parts of the refrigerant cycle device 10 of the eleventh embodiment are similar to those of the above-described first embodiment.

The refrigerant cycle device 10 with the above-mentioned structure of the eleventh embodiment can be operated to obtain the same effects as those of the first embodiment, while obtaining the cooling effect in the third evaporator 32. At this time, the dynamic pressure of the refrigerant on the downstream side of the diffuser portion 15d of the ejector 15 can be also applied to the third evaporator 32, so as to allow the refrigerant to surely flow into the third evaporator 32. Thus, the refrigeration capacity can be also obtained in the third evaporator 32.

In the refrigerant cycle device 10 of the eleventh embodiment, the refrigerant distribution unit 16 described in the above-described first embodiment is used. However, the refrigerant distribution unit 20 described in the second embodiment may be used instead of the refrigerant distribution unit 16, in the refrigerant cycle device 10 of the eleventh embodiment.

Twelfth Embodiment

Figure 17:
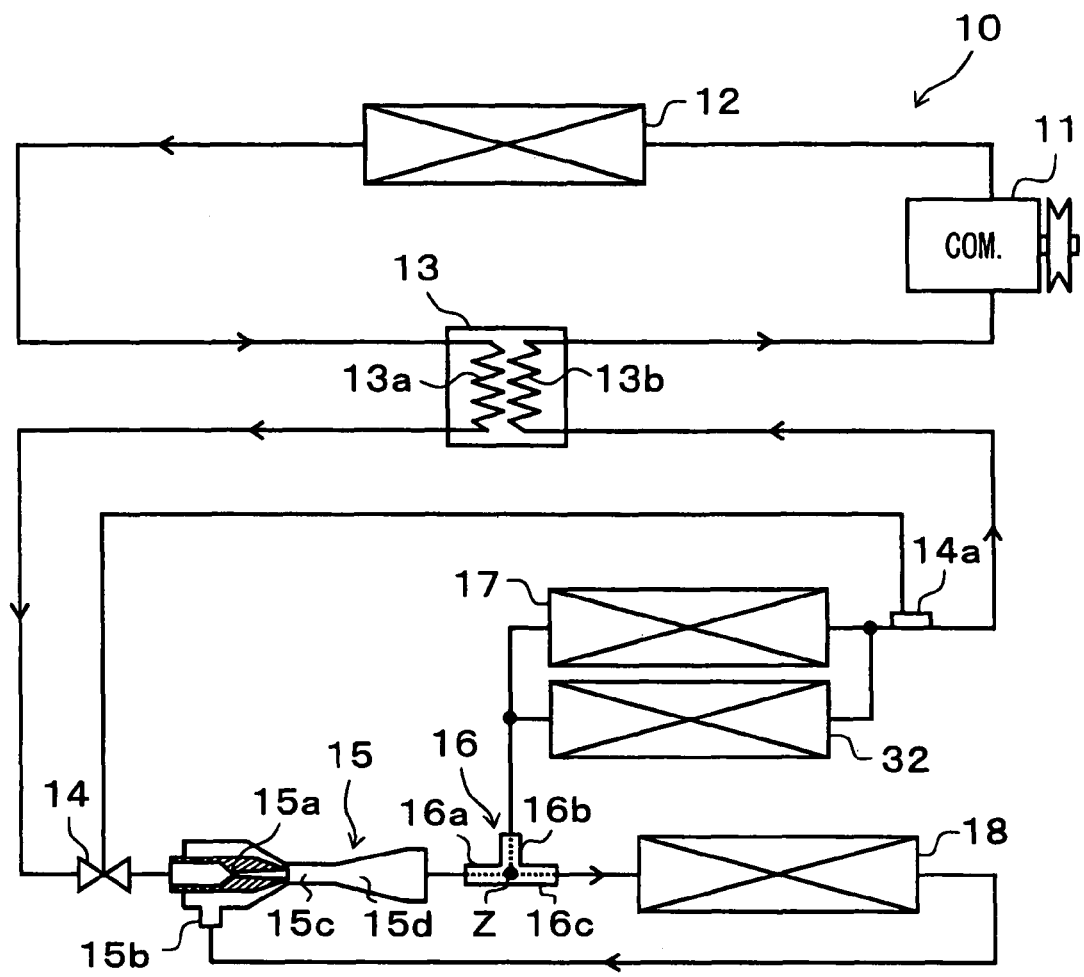
FIG. 17 is a schematic diagram showing a refrigerant cycle device having an ejector, according to a twelfth embodiment of the present invention.

A twelfth embodiment of the present invention will be now described with reference to FIG. 17. As shown in the entire construction diagram of FIG. 17, the twelfth embodiment differs from the structure of the first embodiment in that the third evaporator 32 is connected in parallel to the first evaporator 17. That is, the refrigerant flowing out of the first leading pipe 16c of the refrigerant distribution unit 16 flows into both the first evaporator 17 and the third evaporator 32 in parallel, and is joined to flow toward the refrigerant suction side of the compressor 11. The other parts of the refrigerant cycle device 10 of the twelfth embodiment are similar to those of the above-described first embodiment.

The refrigerant cycle device 10 with the above-mentioned structure of this embodiment can be operated to obtain the same effects as those of the first embodiment, while obtaining the cooling effect at the third evaporator 32. In this case, the suction effect of the compressor 11 surely allows the refrigerant to flow into the third evaporator 32, so that the refrigeration capacity can be obtained in the third evaporator 32.

In the refrigerant cycle device 10 of the twelfth embodiment, the refrigerant distribution unit 16 described in the above-described first embodiment is used. However, the refrigerant distribution unit 20 described in the second embodiment may be used instead of the refrigerant distribution unit 16, in the refrigerant cycle device 10 of the twelfth embodiment.

Other Embodiments

Although the present invention has been fully described in connection with the preferred embodiments thereof with reference to the accompanying drawings, it is to be noted that various changes and modifications will become apparent to those skilled in the art.

(1) For example, in the above-mentioned embodiments, spaces to be cooled by the first evaporator 17 and the second evaporator 18 do not have been described in detail. The first and second evaporators 17 and 18 can be located to cool air to be blown by the respective different blower fans, and thus may be used for cooling different spaces to be cooled and air-conditioned. Alternatively, the first and second evaporators 17 and 18 may be used for cooling the same space to be cooled and air-conditioned.

Figure 18:
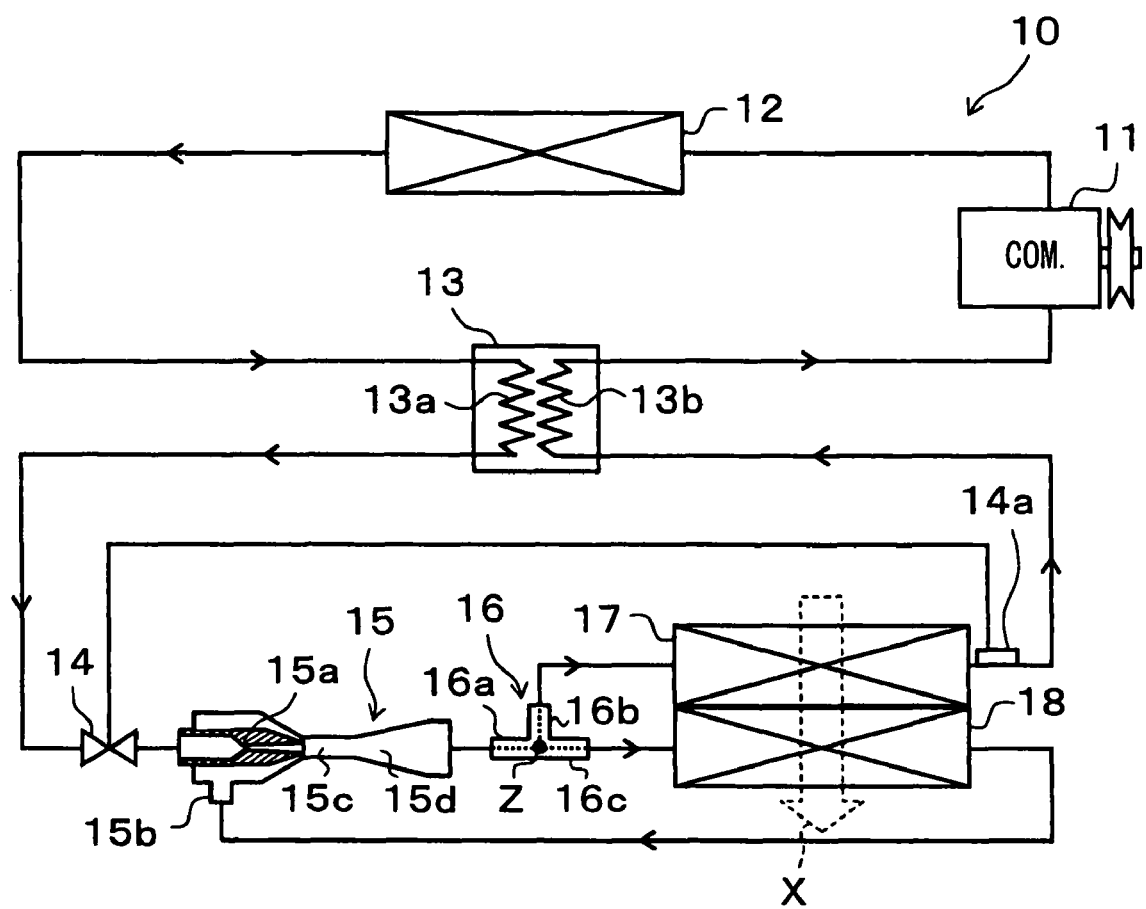
FIG. 18 is a schematic diagram showing a refrigerant cycle device having an ejector, according to a modification embodiment of the present invention.

When the first and second evaporators 17 and 18 are used for cooling and air-conditioning the same space to be cooled, as shown in FIG. 18, the first and second evaporators 17 and 18 of the first embodiment may be assembled to an integrated structure. Furthermore, the same space may be cooled by allowing the air blown by the blower fan to pass through the first evaporator 17 and the second evaporator 18 in that order as indicated by the direction of arrow X in FIG. 18.

Because the gas refrigerant evaporated in the second evaporator 18 is drawn by the ejector 15 via the refrigerant suction port 15b, the refrigerant evaporation pressure (refrigerant evaporation temperature) of the second evaporator 18 is low as compared to that of the first evaporator 17. Accordingly, it is possible to obtain a difference in temperature between the refrigerant evaporation temperature of the first evaporator 17 and the temperature of blown air, and a difference in temperature between the refrigerant evaporation temperature of the second evaporator 18 and the temperature of blown air, thereby effectively cooling the blown air in both the first and second evaporators 17, 18.

Specific means for assembling the first evaporator 17 and the second evaporator 18 to the integrated structure may include, for example, making components of the first and second evaporators 17 and 18 of aluminum, and connecting these evaporators 17 and 18 to an integrated structure by connecting means such as brazing. Alternatively, these evaporators 17 and 18 may be integrally connected with a space of 10 mm or less therebetween by mechanical engagement means such as bolting.

A fin and tube type heat exchanger may be used as the first evaporator 17 and the second evaporator 18. The first evaporator 17 and the second evaporator 18 may use a common fin, and may be integrally connected to each other in the form of divided components made of tubes in contact with the fin.

Likewise, in the ninth to twelfth embodiments, the first to third evaporators 17, 18, and 32 may be assembled to an integrated structure. For example, in the tenth and eleventh embodiments, the second evaporator 18 and the third evaporator 32 may be integrally formed. In the twelfth embodiment, the first evaporator 17 and the third evaporator 32 may be assembled in the form of an integrated structure.

(2) Although in the above embodiments, the refrigerant cycle device 10 of the invention is typically used for an air conditioner for a vehicle or a freezer and refrigerator for a vehicle, the invention is not limited to thereto. For example, the invention may be applied to an industrial refrigerator, a household refrigerator, a cooler for an automatic dispenser, a refrigerated showcase, and the like. In this case, the electric compressor may be employed as the compressor. An HC-based refrigerant, in addition to a Freon-based refrigerant, and carbon dioxide, may also be used as the refrigerant.

In the above-mentioned first to fifth, and ninth to twelfth embodiments, the thermal expansion valve is used as the expansion valves 14 and 22, but the expansion valve is not limited thereto. Also, in the above-mentioned embodiments, an electric expansion valve may be used to calculate a degree of superheat from the detection values of the pressure sensor and the temperature sensor, and thus the valve opening degree of the electrical expansion valve may be adjusted such that the superheat degree becomes a predetermined value, like the sixth to eighth embodiments.

(4) Although in the above-mentioned embodiments the fixed ejector including the nozzle portion 15a whose refrigerant passage area is constant is used as the ejector 15, and the ejector 15 and the expansion valves 14, 22, and 24 serving as the flow amount adjustment means are formed independently, the invention is not limited thereto. The ejector 15 may be integrally formed with the expansion valves 14, 22, and 24.

For example, a variable ejector including a variable nozzle portion whose refrigerant passage area is adjustable may be used as the ejector 15. Specifically, the variable nozzle portion may be a mechanism in which a needle is inserted into a passage of the variable nozzle portion and the refrigerant passage area is adjusted by controlling the position of the needle by an electric actuator.

In the above-mentioned embodiments, the radiator 12 is used as an outdoor side heat exchanger for exchanging heat between the refrigerant and the outside air, while the first evaporator 17, the second evaporator 18, and the third evaporator 32 are used as an indoor side heat exchanger. In this case, the evaporators 17, 18 and 32 may be used for cooling the inside of the vehicle compartment or the refrigerator or freezing chamber. Conversely, the invention may be applied to a heat pump cycle in which the first to third evaporators 17, 18, and 32 are constructed as the outdoor side heat exchanger for absorbing heat from a heat source, such as outside air, and the radiator 12 is constructed as the indoor side heat exchanger for heating a fluid to be heated, such as air or water.

(5) In the refrigerant cycle device 10 of the above-described any one embodiment, the internal heat exchanger 13 having a high-pressure side refrigerant flow path 13a and a low-pressure side refrigerant flow path 13b or/and the accumulator 23 may be omitted.

In addition, the components and features of the above-described embodiments may be suitably combined without being limited to each example of the embodiments.

Any aspect of the present invention can be applied to a refrigerant cycle device that includes the compressor 11 for compressing and discharging refrigerant; radiator 12 for cooling high-temperature and high-pressure refrigerant discharged from the compressor 11; the ejector 15 including the nozzle portion 15a for decompressing and expanding the refrigerant on a downstream side of the radiator 12, and the refrigerant suction port 15b from which refrigerant is drawn by a refrigerant flow jetted from the nozzle portion 15a at high velocity; the branch portion Z for branching a flow of the refrigerant flowing out of the ejector 15 into at least a first refrigerant stream and a second refrigerant stream; the first evaporator 17 for evaporating the refrigerant of the first refrigerant stream branched by the branch portion Z to allow the refrigerant to flow to a suction side of the compressor 11; and the second evaporator 18 for evaporating the refrigerant of the second refrigerant stream branched by the branch portion Z to allow the refrigerant to flow to an upstream side of the refrigerant suction port 15b.

As an example of the present invention, the branch portion Z may be located to maintain a dynamic pressure of the refrigerant flowing out of the ejector 15, and the second evaporator 18 is connected to the branch portion Z in a range where the dynamic pressure of the refrigerant flowing out of the ejector 15 is applied to an inside of the second evaporator 18. Alternatively, the branch portion Z and the second evaporator 18 may be connected without a throttling therebetween such that the dynamic pressure of the refrigerant flowing out of the ejector 15 is directly applied to the inside of the second evaporator 18. Alternatively, the branch portion Z may be connected to the ejector 15 and the second evaporator 18 such that the following relationship is satisfied in a target flow amount of refrigerant drawn into the refrigerant suction port:

$$(Ps1-Ps4)+Pv1 \geq (Ps1-Ps2)+(Ps2-Ps3)+(Ps3-Ps4)+Pv2$$

wherein $Ps1$ is a static pressure of the refrigerant at an outlet of the diffuser portion 15d, $Pv1$ is a dynamic pressure of the refrigerant at the outlet of the diffuser portion 15d, $Ps2$ is a static pressure of the refrigerant at an inlet of the second evaporator 18, $Pv2$ is a dynamic pressure of the refrigerant at the inlet of the second evaporator 18, $Ps3$ is a static pressure of the refrigerant at an outlet of the second evaporator 18, and $Ps4$ is a static pressure of the refrigerant at the refrigerant suction port 15b. In this case, the target flow amount of refrigerant drawn into the refrigerant suction port 15b can be obtained, thereby obtaining the cooling capacity in the second evaporator 18.

For example, the refrigerant cycle device 10 may be provided with a throttle device 21 for decompressing and expanding the refrigerant in a refrigerant flow path from the branch portion Z to the inlet of the second evaporator 18. Alternatively, the second evaporator 18 may include a plurality of evaporating portions 18a, 18b connected in series. In this case, a throttle device 21, for decompressing and expanding the refrigerant, may be located between the evaporating portions 18a, 18b. Furthermore, the branch portion Z may be located inside of the refrigerant distribution unit (16, 20).

In the refrigerant cycle device 10, the flow amount adjustment unit 14 may adjust the flow amount of the refrigerant flowing into the nozzle portion 15a such that a degree of superheat of the refrigerant on an outlet side of the first evaporator 17 becomes a predetermined value. Alternatively, the flow amount adjustment unit 22 may adjust the flow amount of the refrigerant flowing into the nozzle portion 15a such that a degree of superheat of the refrigerant on an outlet side of the second evaporator 18 becomes a predetermined value. Alternatively, the flow amount adjustment unit 24 may adjust the flow amount of the refrigerant flowing to the nozzle portion 15a such that the pressure detected by the pressure sensor 25 becomes a target pressure.

Such changes and modifications are to be understood as being within the scope of the present invention as defined by the appended claims.

What is claimed is:

1. A refrigerant cycle device comprising:
a compressor for compressing and discharging refrigerant;
a radiator for cooling high-temperature and high-pressure refrigerant discharged from the compressor;
an ejector including a nozzle portion for decompressing and expanding the refrigerant on a downstream side of the radiator, and a refrigerant suction port from which refrigerant is drawn by a refrigerant flow jetted from the nozzle portion at high velocity;
a branch portion for branching a flow of the refrigerant flowing out of the ejector into at least a first refrigerant stream and a second refrigerant stream;
a first evaporator for evaporating the refrigerant of the first refrigerant stream branched by the branch portion to allow the refrigerant to flow to a suction side of the compressor;
a second evaporator for evaporating the refrigerant of the second refrigerant stream branched by the branch portion to allow the refrigerant to flow to an upstream side of the refrigerant suction port, and
a refrigerant distribution unit that includes an introduction pipe for allowing the refrigerant to flow thereinto, a first leading pipe for allowing the refrigerant to flow to the first evaporator, and a second leading pipe for allowing the refrigerant to flow to the second evaporator,
wherein the branch portion maintains a dynamic pressure of the refrigerant flowing out of the ejector,
wherein the branch portion and the second evaporator are connected without a throttling therebetween and the dynamic pressure of the refrigerant flowing out of the elector generally equal to a dynamic pressure of the refrigerant flowing into the second evaporator;
wherein the branch portion is located inside of the refrigerant distribution unit, and
wherein an inflow direction of the refrigerant in the introduction pipe is substantially the same as an outflow direction of the refrigerant in the second leading pipe.

2. The refrigerant cycle device according to claim 1,
wherein the ejector further includes a diffuser portion in which the refrigerant jetted from the nozzle portion and the refrigerant drawn from the refrigerant suction port are mixed and the mixed refrigerant is pressurized, and the branch portion is connected to the ejector and the second evaporator such that the following relationship is satisfied in a target flow amount of refrigerant drawn into the refrigerant suction port:

$$(Ps1-Ps4)+Pv1 \geq (Ps1-Ps2)+(Ps2-Ps3)+(Ps3-Ps4)+Pv2$$

wherein $Ps1$ is a static pressure of the refrigerant at an outlet of the diffuser portion, $Pv1$ is a dynamic pressure of the refrigerant at the outlet of the diffuser portion, $Ps2$ is a static pressure of the refrigerant at an inlet of the second evaporator, $Pv2$ is a dynamic pressure of the refrigerant at the inlet of the second evaporator, $Ps3$ is a static pressure of the refrigerant at an outlet of the second evaporator, and $Ps4$ is a static pressure of the refrigerant at the refrigerant suction port.

3. The refrigerant cycle device according to claim 2, wherein the second evaporator includes a plurality of evaporating portions connected in series, the device further comprising
a throttle device, for decompressing and expanding the refrigerant, located between the evaporating portions.

4. The refrigerant cycle device according to claim 1, further comprising
a refrigerant distribution unit that includes an introduction pipe for allowing the refrigerant to flow thereinto, a first leading pipe for allowing the refrigerant to flow to the first evaporator, and a second leading pipe for allowing the refrigerant to flow to the second evaporator,
wherein the branch portion is disposed inside of the refrigerant distribution unit, and
wherein an outflow direction of the refrigerant in the first leading pipe and an outflow direction of the refrigerant in the second leading pipe are respectively directed in predetermined directions with respect to an inflow direction of the refrigerant in the introduction pipe, while intersecting at a sharp angle.

5. The refrigerant cycle device according to claim 1, further comprising
a flow amount adjustment unit located to adjust a flow amount of the refrigerant flowing into the nozzle portion,
wherein the flow amount adjustment unit adjusts the flow amount of the refrigerant flowing into the nozzle portion such that a degree of superheat of the refrigerant on an outlet side of the first evaporator becomes a predetermined value.

6. The refrigerant cycle device according to claim 1, further comprising
a flow amount adjustment unit located to adjust a flow amount of the refrigerant flowing into the nozzle portion,
wherein the flow amount adjustment unit adjusts the flow amount of the refrigerant flowing into the nozzle portion such that a degree of superheat of the refrigerant on an outlet side of the second evaporator becomes a predetermined value.

7. The refrigerant cycle device according to claim 1, further comprising:
a flow amount adjustment unit located to adjust a flow amount of the refrigerant flowing into the nozzle portion; and
a pressure detection unit for detecting a pressure of the refrigerant on an inlet side of the second evaporator,
wherein the flow amount adjustment unit adjusts the flow amount of the refrigerant flowing to the nozzle portion such that the pressure detected by the pressure detection unit becomes a target pressure.

8. The refrigerant cycle device according to claim 7, further comprising
a temperature detection unit for detecting a temperature of the refrigerant on the inlet side of the second evaporator,
wherein the target pressure is determined based on the temperature detected by the temperature detection unit.

9. The refrigerant cycle device according to claim 1, further comprising:
a flow amount adjustment unit located to adjust a flow amount of the refrigerant flowing into the nozzle portion; and
a pressure detection unit for detecting a pressure of the refrigerant on an outlet side of the second evaporator,
wherein the flow amount adjustment unit adjusts the flow amount of the refrigerant flowing to the nozzle portion such that the pressure detected by the pressure detection unit becomes a target pressure.

10. The refrigerant cycle device according to claim 1, further comprising:
a flow amount adjustment unit located to adjust a flow amount of the refrigerant flowing into the nozzle portion; and a temperature detection unit for detecting a temperature of the refrigerant on an outlet side of the second evaporator, wherein the flow amount adjustment unit adjusts the flow amount of the refrigerant flowing to the nozzle portion such that the temperature detected by the temperature detection unit becomes a target temperature.

11. The refrigerant cycle device according to claim 1, further comprising:

a flow amount adjustment unit located to adjust a flow amount of the refrigerant flowing into the nozzle portion; and a pressure detection unit for detecting a pressure of the refrigerant on an upstream side of the flow amount adjustment unit, wherein the flow amount adjustment unit adjusts the flow amount of the refrigerant flowing to the nozzle portion such that the pressure detected by the pressure detection unit becomes a target pressure.

12. The refrigerant cycle device according to claim 1, wherein the introduction pipe, the first leading pipe and the second leading pipe have different diameters.

13. The refrigerant cycle device according to claim 1, wherein the introduction pipe and the second leading pipe of the refrigerant distribution unit are configured to extend approximately in a horizontal direction.

14. The refrigerant cycle device according to claim 1, wherein the branch portion is located within the refrigerant distribution unit at a branch position between the first leading pipe and the second leading pipe.

15. A refrigerant cycle device comprising:

a compressor compressing and discharging refrigerant;

a radiator cooling high-temperature and high-pressure refrigerant discharged from the compressor;

an ejector including a nozzle portion decompressing and expanding the refrigerant on a downstream side of the radiator, and a refrigerant suction port from which refrigerant is drawn by a refrigerant flow jetted from the nozzle portion at high velocity;

a branch portion branching a flow of the refrigerant flowing out of the ejector into at least a first refrigerant stream and a second refrigerant stream;

a first evaporator evaporating the refrigerant of the first refrigerant stream branched by the branch portion to allow the refrigerant to flow to a suction side of the compressor; and a second evaporator evaporating the refrigerant of the second refrigerant stream branched by the branch portion to allow the refrigerant to flow to an upstream side of the refrigerant suction port, wherein the branch portion maintains a dynamic pressure of the refrigerant flowing out of the ejector, and wherein the dynamic pressure of the refrigerant flowing out of the ejector is generally equal to a dynamic pressure of the refrigerant flowing into the second evaporator.

* * * * *